United States Patent
Sommerhoff et al.

(10) Patent No.: US 10,267,240 B2
(45) Date of Patent: Apr. 23, 2019

(54) METHOD AND SYSTEM FOR AN ENGINE

(71) Applicant: Ford Global Technologies, LLC, Dearborn, MI (US)

(72) Inventors: Franz Arnd Sommerhoff, Aachen (DE); Joerg Kemmerling, Monschau (DE); Vanco Smiljanovski, Bedburg (DE); Helmut Matthias Kindl, Aachen (DE); Werner Willems, Aachen (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 493 days.

(21) Appl. No.: 15/175,829

(22) Filed: Jun. 7, 2016

(65) Prior Publication Data

US 2016/0369710 A1    Dec. 22, 2016

(30) Foreign Application Priority Data

Jun. 19, 2015   (DE) .................... 10 2015 211 329

(51) Int. Cl.
| | |
|---|---|
| F02D 13/06 | (2006.01) |
| F02D 17/02 | (2006.01) |
| F02D 41/00 | (2006.01) |
| F01L 13/08 | (2006.01) |
| F01L 13/00 | (2006.01) |

(52) U.S. Cl.
CPC .......... F02D 17/026 (2013.01); F02D 13/06 (2013.01); F02D 41/0007 (2013.01); F02D 41/0087 (2013.01); F01L 13/08 (2013.01); F01L 2013/001 (2013.01); F02D 41/0082 (2013.01); F02D 2041/0012 (2013.01); Y02T 10/144 (2013.01); Y02T 10/18 (2013.01)

(58) Field of Classification Search
CPC .......... F02B 33/22; F02B 33/44; F02B 41/06; Y02T 10/18; F01L 13/0005; F02D 17/023; F02D 17/026
USPC ............................... 123/198 F, 70 R; 60/285
See application file for complete search history.

(56) References Cited

U.S. PATENT DOCUMENTS

| | | | |
|---|---|---|---|
| 3,765,394 A | 10/1973 | Francis | |
| 3,941,113 A * | 3/1976 | Baguelin | F02B 1/06 123/179.1 |
| 4,096,845 A | 6/1978 | Holmes | |
| 7,610,903 B2 * | 11/2009 | Maehara | F01L 1/022 123/198 F |
| 9,103,237 B2 * | 8/2015 | Borean | F02D 41/0087 |
| 2003/0047163 A1 * | 3/2003 | Haghgooie | F01L 9/04 123/308 |
| 2003/0230259 A1 * | 12/2003 | Suh | F02B 11/00 123/70 R |
| 2009/0007877 A1 | 1/2009 | Raiford | |

(Continued)

FOREIGN PATENT DOCUMENTS

| | | |
|---|---|---|
| DE | 2719668 A1 | 11/1978 |
| DE | 2908718 A1 | 9/1980 |

(Continued)

*Primary Examiner* — Marguerite J McMahon
*Assistant Examiner* — James J Kim
(74) *Attorney, Agent, or Firm* — Julia Voutyras; McCoy Russell LLP

(57) ABSTRACT

Methods and systems are provided for a variable displacement engine. In one example, a method may include flowing charge air from a deactivated cylinder to an adjacent firing cylinder.

21 Claims, 7 Drawing Sheets

(56) References Cited

U.S. PATENT DOCUMENTS

2009/0013669 A1* 1/2009 Winstead ............ F02D 13/0207
60/278
2010/0282225 A1* 11/2010 Gilbert .................... F01L 9/026
123/70 R
2011/0220075 A1* 9/2011 Meldolesi ............... F02B 33/22
123/70 R
2016/0108822 A1* 4/2016 Kim ......................... F02D 9/08
123/332

FOREIGN PATENT DOCUMENTS

| DE | 10154947 A1 | 5/2002 |
| DE | 102010054520 A1 | 6/2012 |
| DE | 202014104433 U1 | 10/2014 |
| GB | 2009316 B | 4/1982 |

* cited by examiner

METHOD AND SYSTEM FOR AN ENGINE

CROSS REFERENCE TO RELATED APPLICATION

This application claims priority to German Patent Application No. 102015211329.9, filed Jun. 19, 2015, the entire contents of which are hereby incorporated by reference for all purposes.

FIELD

The present description relates generally to providing charge air during deactivation of one or more cylinders of an engine.

BACKGROUND/SUMMARY

An aim in the development of internal combustion engines is that of minimizing fuel consumption. In this connection, too, the supercharging of internal combustion engines is becoming ever more ubiquitous. Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. If the swept volume is reduced, it is thus possible, given the same vehicle boundary conditions, to shift the load collective toward higher loads, at which the specific fuel consumption is lower. Supercharging of an internal combustion engine consequently assists in the efforts to minimize fuel consumption, that is to say, to improve the efficiency of the internal combustion engine.

The configuration of the exhaust-gas turbocharging often poses difficulties, wherein it is basically sought to obtain a noticeable performance increase in all engine speed ranges. However, a torque drop is generally observed in the event of a certain engine speed being undershot. Said torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. This has the result that, toward lower engine speeds, the charge pressure ratio and the charge pressure likewise decrease, which equates to a torque drop.

A further approach to a solution for dethrottling an Otto-cycle engine is offered by cylinder deactivation, that is to say the deactivation of individual cylinders in certain load ranges. The efficiency of the Otto-cycle engine in part-load operation can be improved, that is to say increased, by means of a partial deactivation, because the deactivation of one cylinder of a multi-cylinder internal combustion engine increases the load on the other cylinders, which remain in operation, if the engine power remains constant, such that the throttle flap may be opened further in order to introduce a greater air mass into said cylinders, whereby dethrottling of the internal combustion engine is attained overall. During the partial deactivation, the cylinders which are permanently in operation furthermore operate in the region of higher loads, at which the specific fuel consumption is lower. The load collective is shifted toward higher loads.

In the case of diesel engines, the partial deactivation is also intended to prevent the fuel-air mixture from becoming too lean as part of the quality regulation in the event of decreasing load as a result of a reduction of the fuel quantity used.

However, the inventors herein have recognized potential issues with such systems. As one example, the above systems limit an engine load range which cylinders may be deactivated.

In one example, the issues described above may be addressed by a method comprising operating a supercharged auto-ignition internal combustion engine having at least one cylinder head comprising at least two cylinders, each cylinder having at least one outlet opening for discharging exhaust gases to an exhaust-gas discharge system and at least one inlet opening for receiving charge air from an intake system, and where each cylinder further comprises a piston which is movable along a piston longitudinal axis between a bottom dead center BDC and a top dead center TDC; and the intake system further comprising at least one exhaust-gas turbocharger a compressor coupled to a turbine arranged in the exhaust-gas discharge system, adjusting a position of the inlet openings and outlet openings of the cylinders via a valve drive, and deactivating one of the two cylinders during some engine conditions, where the deactivation further includes discharging intake air received by the deactivated cylinder to an operational cylinder through at least one inlet opening of the inlet openings of the deactivated cylinder following a compression stroke of a piston of the deactivated cylinder moving from bottom dead center to top dead center to a flow transfer duct, and where the flow transfer duct direct the discharged charge air to an operational cylinder. In this way, an engine load range in which one or more cylinders of an engine may be deactivated is increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
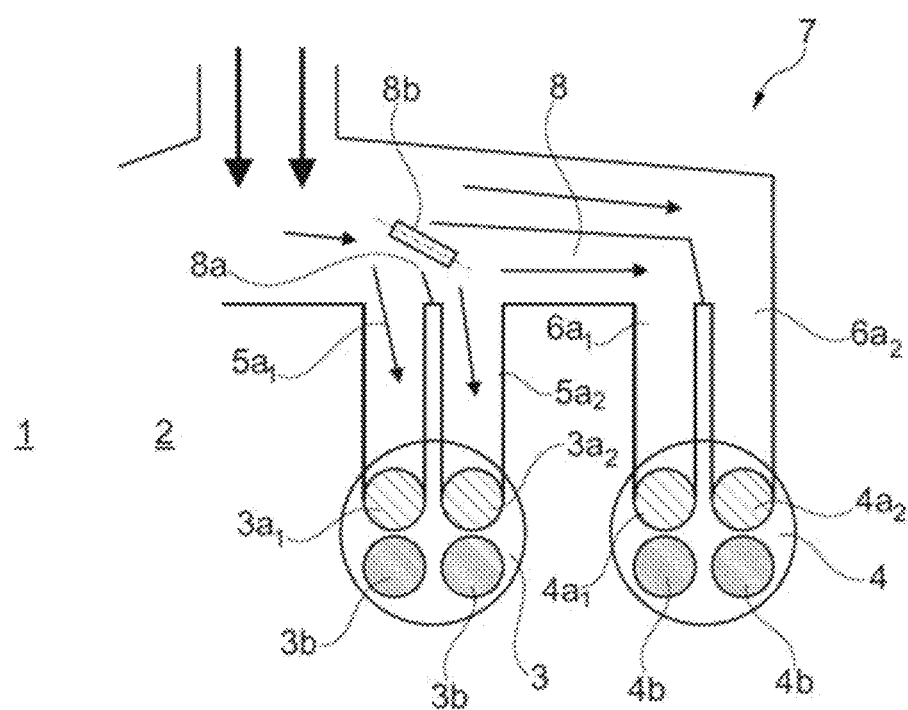
FIG. 1 shows an embodiment of an internal combustion four-cylinder engine having two cylinders of a group of cylinders illustrated in detail.
Figure 2A:
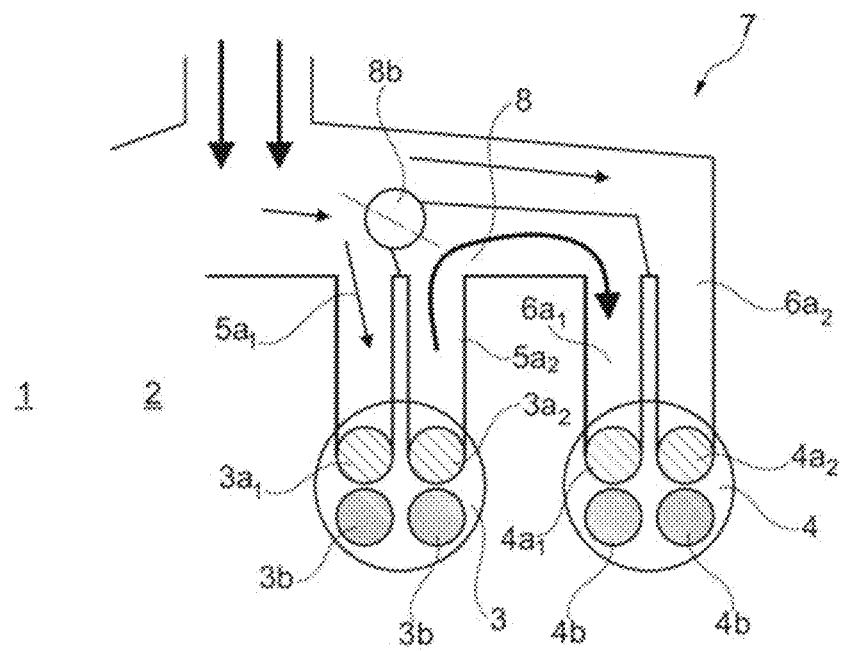
FIG. 2A shows the internal combustion four-cylinder engine having one cylinder of the two cylinders of the group of cylinders being at least partially deactivated.
Figure 2B:
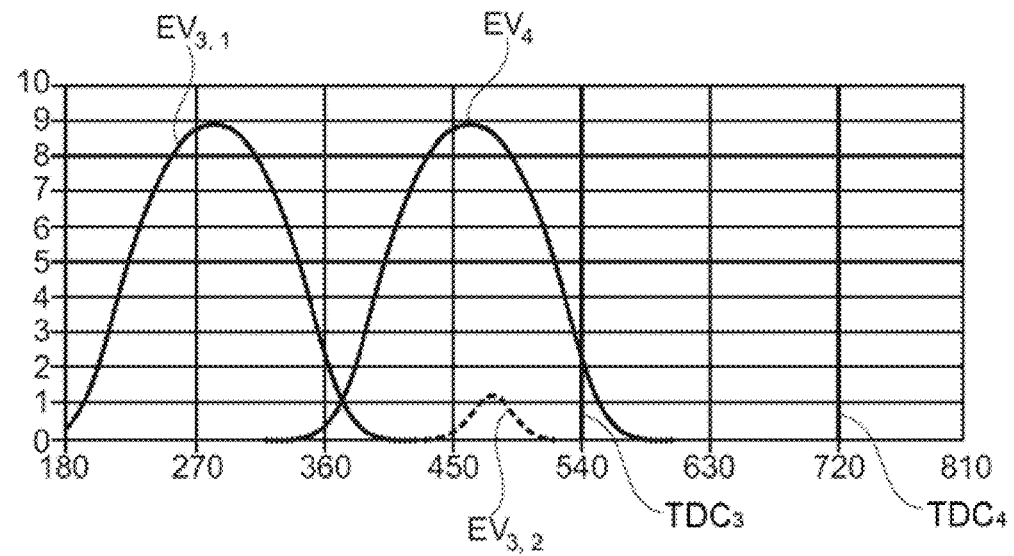
FIG. 2B shows a diagram depicting travel curves of inlet valves of the two cylinders in the group of cylinders.
Figure 3:
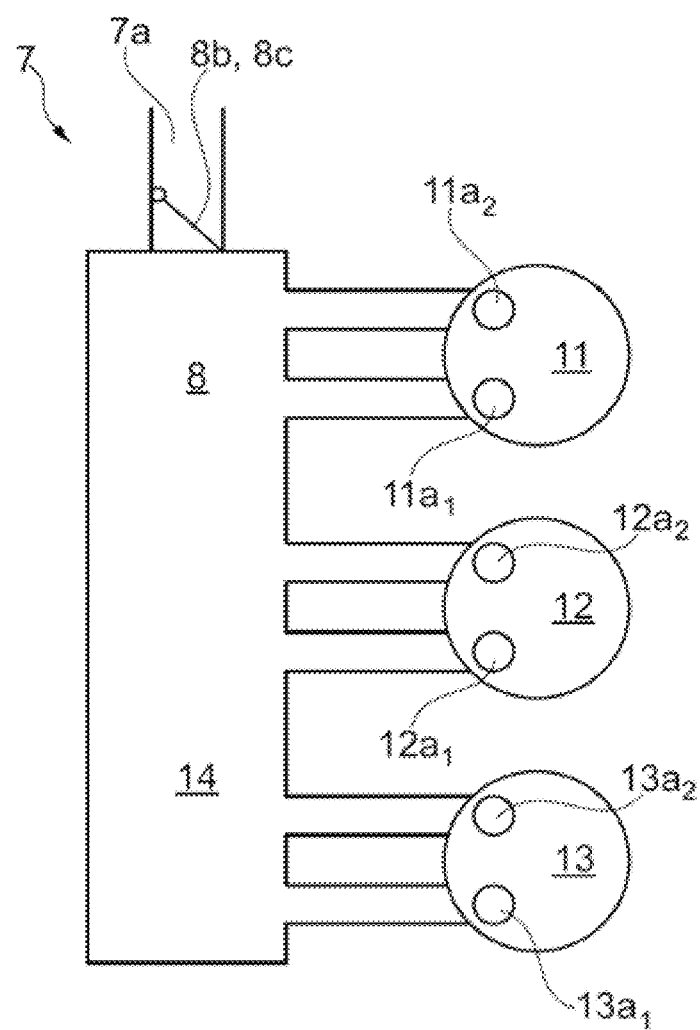
FIG. 3 shows a second embodiment of an internal combustion engine having three cylinders.
Figure 4:
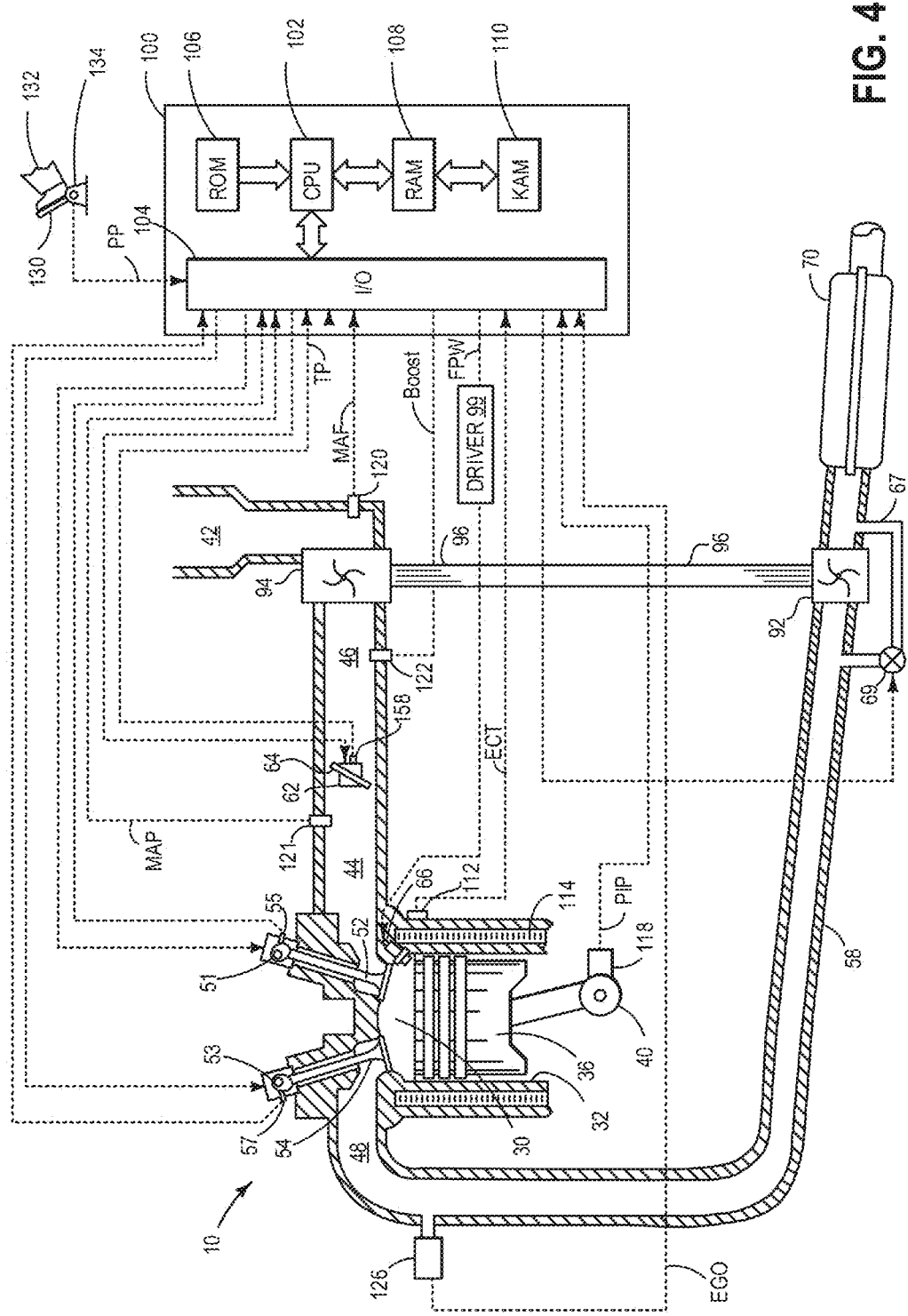
FIG. 4 shows a single cylinder of an engine in detail.
Figure 5:
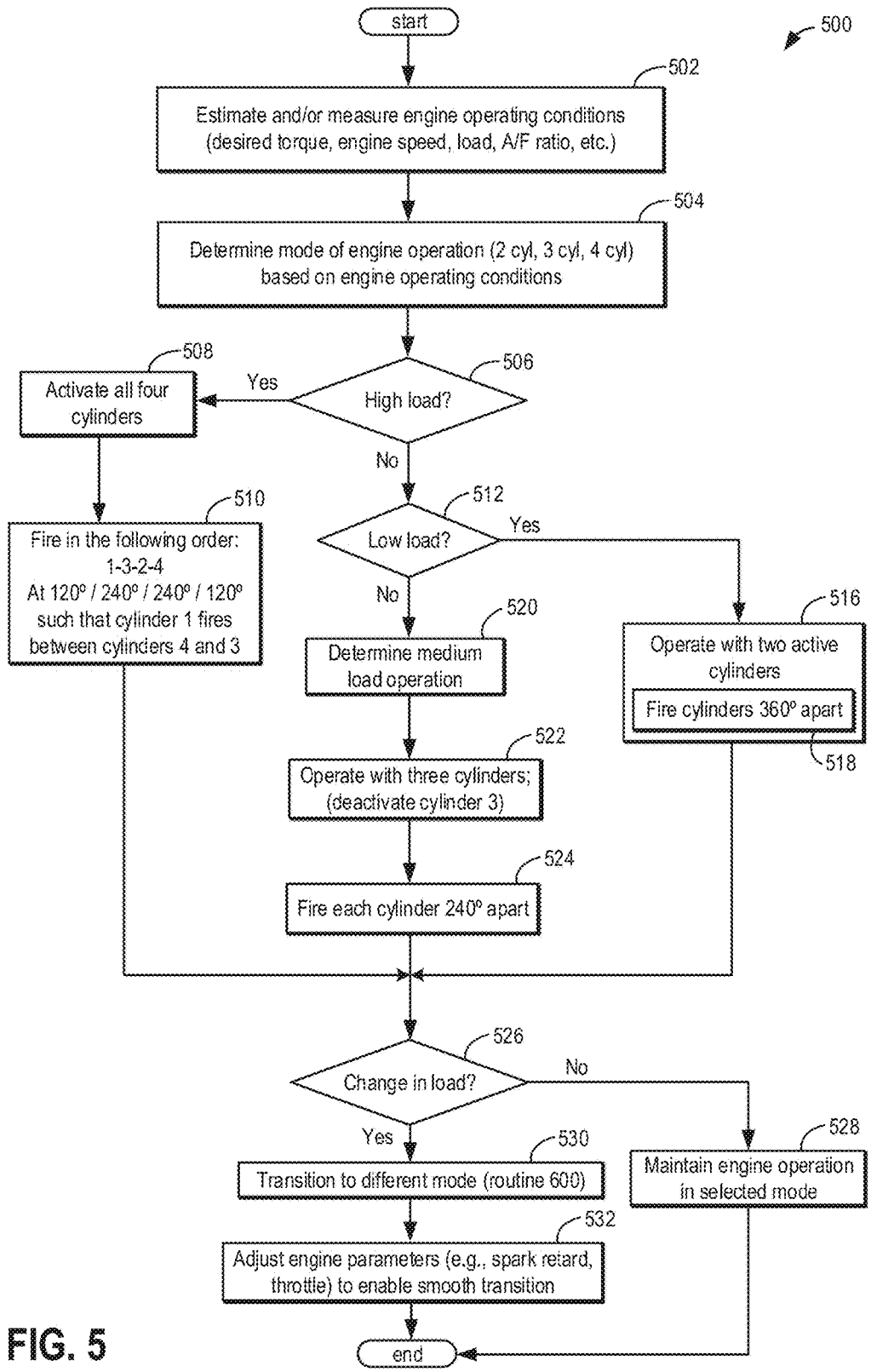
FIG. 5 shows a method for determining a variable displacement engine (VDE) mode to operate in based on an engine load.

The following description relates to systems and methods for flowing charge air from a partially deactivated cylinder to an adjacent firing cylinder. An engine may comprise a plurality of cylinders with a first outer cylinder being adjacent to a second inner cylinder, where the first and second cylinders form a cylinder group. A first flow transfer duct fluidly couples one or more inlet valves of the first outer cylinder to one or more inlet valves of the second inner cylinder, as shown in FIG. 1. An inlet valve of the second inner cylinder is actuated to an at least partially open position during a compression stroke of the second inner cylinder when the second inner cylinder is at least partially deactivated. Intake air from the second inner cylinder flows into the first flow transfer duct before flowing to the first outer cylinder. Consequently, the first outer cylinder is undergoing an intake stroke and receives the charge air discharged from the second cylinder, as shown in FIG. 2A. A valve lift of the inlet valve of the second inner cylinder during its compression stroke during partial deactivation is less than a valve lift of the inlet valve during an intake stroke of the second inner cylinder, as shown in FIG. 2B. Thus, the second cylinder may be a charge-air supplying cylinder when it is partially deactivated. In some example, there may be three cylinders in a cylinder group, as shown in FIG. 3. A single cylinder of the engine comprises at least one inlet valve and at least one exhaust valve along with other components, as shown in FIG. 4. A method for adjusting operation of the engine from a non-VDE mode (e.g., all cylinders are firing) to a VDE mode (e.g., at least one cylinder of a plurality of cylinders is deactivated) is described below. Specifically, a method for determining an engine load of a four-cylinder engine and adjusting engine operation to a non-VDE mode or a VDE mode is described, as shown in FIG. 5. A method for adjusting engine operation between non-VDE mode and VDE modes is described in FIG. 6. An engine operating sequence illustrating adjustment of a shut-off valve in the flow transfer duct during deactivation of the second inner cylinder is shown in FIG. 7.

The present disclosure relates to a method for operating a supercharged auto-ignition internal combustion engine having at least one cylinder head comprising at least two cylinders, in which each cylinder has at least one outlet opening for the discharge of the exhaust gases via an exhaust-gas discharge system and at least one inlet opening for the supply of charge air via an intake system and has a piston which is movable along a piston longitudinal axis between a bottom dead center BDC and a top dead center TDC, at least one exhaust-gas turbocharger is provided which comprises a turbine arranged in the exhaust-gas discharge system and a compressor arranged in the intake system, at least two cylinders are configured in such a way that said cylinders form at least two groups with in each case at least one cylinder, the at least one cylinder of a first group being a cylinder which is operational even in the event of a partial deactivation of the internal combustion engine, and the at least one cylinder of a second group being formed as a cylinder which can be switched in a load-dependent manner, and each inlet opening and each outlet opening of a cylinder is equipped with a valve drive with a valve which shuts off and opens up the associated opening.

The present disclosure also relates to a supercharged auto-ignition internal combustion engine for carrying out such a method. An auto-ignition internal combustion engine of the stated type is used as a motor vehicle drive unit. Within the context of the present disclosure, the expression "auto-ignition internal combustion engine" encompasses diesel engines but also hybrid internal combustion engines, that is to say auto-ignition internal combustion engines that are operated using a hybrid combustion process, and hybrid drives which comprise not only the auto-ignition internal combustion engine but also an electric machine which can be connected in terms of drive to the internal combustion engine and which receives power from the internal combustion engine or which, as a switchable auxiliary drive, additionally outputs power. Internal combustion engines have a cylinder block and at least one cylinder head which are connected to one another to form the individual cylinders.

Modern internal combustion engines are operated virtually exclusively in accordance with a four-stroke working process. During the charge exchange, the combustion gases are discharged via the outlet openings of the at least two cylinders and the charging with charge air takes place via the inlet openings. To control the charge exchange, an internal combustion engine desires control elements and actuating devices for actuating said control elements. To control the charge exchange, in four-stroke engines, use is made almost exclusively of lifting valves as control elements, which lifting valves perform an oscillating lifting movement during the operation of the internal combustion engine and which lifting valves open and close the inlet openings and outlet openings in this way. The valve actuating mechanism desired for the movement of a valve, including the valve itself, is referred to as the valve drive. The at least one cylinder head generally serves to hold said valve drive.

The valve drive to opens and closes the associated inlet opening and outlet opening of the cylinder at the correct times, with a fast opening of as large a flow cross section as possible being sought in order to keep the throttling losses in the inflowing and outflowing gas flows low and increased charging of the cylinder, that is to say increased discharge of the exhaust gases. The cylinders are therefore also often equipped with a plurality of inlet openings and outlet openings.

The intake lines which lead to the inlet openings, and the exhaust lines which adjoin the outlet openings, are at least partially integrated in the cylinder head. The intake lines of the cylinders are generally merged to form one common overall intake line or in grouped fashion to form multiple overall intake lines. The merging of intake lines to form an overall intake line is referred to generally, and within the context of the present disclosure, as an inlet manifold.

To hold the pistons or the cylinder liners, the cylinder block has a corresponding number of cylinder bores. The piston of each cylinder of an internal combustion engine is guided in an axially movable manner in a cylinder liner and, together with the cylinder liner and the cylinder head, delimits the combustion chamber of a cylinder. The piston serves to transmit the gas forces generated by the combustion to the crankshaft. For this purpose, the piston is articulately connected by means of a piston pin to a connecting rod, which in turn is movably mounted on the crankshaft in the region of a crankshaft throw. The crankshaft which is mounted in the crankcase absorbs the connecting rod forces, with the oscillating stroke movement of the pistons being transformed into a rotational movement of the crankshaft. Here, the crankshaft transmits the torque to the drivetrain.

An aim in the development of internal combustion engines is that of minimizing fuel consumption. In this connection, too, the supercharging of internal combustion engines is becoming ever more important. Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. If the swept volume is reduced, it is thus possible, given the same vehicle boundary conditions, to shift the load collective toward higher loads, at which the specific fuel consumption is lower. Supercharging of an internal combustion engine consequently assists in the efforts to minimize fuel consumption, that is to say, to improve the efficiency of the internal combustion engine.

Supercharged internal combustion engines are preferably equipped with a charge-air cooling arrangement by means of which the compressed combustion air is cooled before it enters the cylinders. In this way, the density of the supplied charge air is increased further. In this way, the cooling likewise contributes to a compression and improved charging of the combustion chambers, that is to say to an improved volumetric efficiency. It may be advantageous for the charge-air cooler to be equipped with a bypass line in order to be able to bypass the charge-air cooler if desired, for example after a cold start.

The internal combustion engine to which the present disclosure relates is an exhaust-gas-turbocharged internal combustion engine. The advantage of an exhaust-gas turbocharger for example in comparison with a mechanical charger is that no mechanical connection for transmitting power may be desired between the charger and internal combustion engine. While a mechanical charger extracts the energy desired for driving it from the internal combustion engine, and thereby reduces the output power and consequently adversely affects the efficiency, the exhaust-gas turbocharger utilizes the exhaust-gas energy of the hot exhaust gases.

The configuration of the exhaust-gas turbocharging often poses difficulties, wherein it is basically sought to obtain a noticeable performance increase in all engine speed ranges. However, a torque drop is generally observed in the event of a certain engine speed being undershot. Said torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. This has the result that, toward lower engine speeds, the charge pressure ratio and the charge pressure likewise decrease, which equates to a torque drop.

The drop in charge pressure can basically be counteracted through the use of a small exhaust-gas turbocharger, that is to say an exhaust-gas turbocharger with a small turbine cross section, in order to be able to generate an adequate charge pressure even at low exhaust-gas flow rates. This will however ultimately shift the torque drop further toward lower engine speeds. Furthermore, said approach, that is to say the reduction in size of the turbine cross section, is subject to limits because the desired supercharging and performance increase may be possible without restriction and to the desired extent even at high engine speeds. A small design of the turbine cross section in combination with an exhaust-gas blow-off facility is not expedient and satisfactory over the entire engine speed range.

It has been sought to improve the torque characteristic of a supercharged internal combustion engine by way of various measures, for example through the use of multiple exhaust-gas turbochargers arranged in series and/or in parallel, possibly in combination with one or more mechanical superchargers and/or electric auxiliary drives.

In the development of internal combustion engines, it is a basic aim to minimize fuel consumption, wherein the emphasis in the efforts being made is on obtaining an improved overall efficiency.

Fuel consumption and thus efficiency pose a problem in particular in the case of Otto-cycle engines, that is to say in the case of applied-ignition internal combustion engines.

The reason for this lies in the fundamental operating process of the Otto-cycle engine. Load control is generally carried out by means of a throttle flap provided in the intake system. By adjusting the throttle flap, the pressure of the inducted air downstream of the throttle flap can be reduced to a greater or lesser extent. The further the throttle flap is closed, that is to say the more said throttle flap blocks the intake system, the higher the pressure loss of the inducted air across the throttle flap, and the lower the pressure of the inducted air downstream of the throttle flap and upstream of the inlet into the at least three cylinders, that is to say combustion chambers. For a constant combustion chamber volume, it is possible in this way for the air mass, that is to say the quantity, to be set by means of the pressure of the inducted air. This also explains why quantity regulation has proven to be disadvantageous specifically in part-load operation, because low loads desire a high degree of throttling and a pressure reduction in the intake system, as a result of which the charge exchange losses increase with decreasing load and increasing throttling.

To reduce the described losses, various strategies for dethrottling an applied-ignition internal combustion engine have been developed.

One approach to a solution for dethrottling the Otto-cycle engine is for example an Otto-cycle engine operating process with direct injection. The direct injection of the fuel is a suitable means for realizing a stratified combustion chamber charge. The direct injection of the fuel into the combustion chamber thus permits quality regulation in the Otto-cycle engine, within certain limits. The mixture formation takes place by the direct injection of the fuel into the cylinders or into the air situated in the cylinders, and not by external mixture formation, in which the fuel is introduced into the inducted air in the intake system.

Another option for optimizing the combustion process of an Otto-cycle engine may comprise at least partially variable valve drive. By contrast to conventional valve drives, in which both the lift of the valves and the timing are invariable, these parameters which have an influence on the combustion process, and thus on fuel consumption, can be varied to a greater or lesser extent by means of variable valve drives. If the closing time of the inlet valve and the inlet valve lift can be varied, this alone makes throttling-free and thus loss-free load control possible. The mixture mass which flows into the combustion chamber during the intake process is then controlled not by means of a throttle flap but rather by means of the inlet valve lift and the opening duration of the inlet valve.

A further approach to a solution for dethrottling an Otto-cycle engine is offered by cylinder deactivation, that is to say the deactivation of individual cylinders in certain load ranges. The efficiency of the Otto-cycle engine in part-load operation can be improved, that is to say increased, by means of a partial deactivation, because the deactivation of one cylinder of a multi-cylinder internal combustion engine increases the load on the other cylinders, which remain in operation, if the engine power remains constant, such that the throttle flap can be opened further in order to introduce a greater air mass into said cylinders, whereby dethrottling of the internal combustion engine is attained overall. During the partial deactivation, the cylinders which are permanently in operation furthermore operate in the region of higher loads, at which the specific fuel consumption is lower. The load collective is shifted toward higher loads.

The cylinders which remain in operation during the partial deactivation furthermore exhibit improved mixture formation owing to the greater air mass or mixture mass supplied.

Further advantages with regard to efficiency are attained in that a deactivated cylinder, owing to the absence of combustion, does not generate any wall heat losses owing to heat transfer from the combustion gases to the combustion chamber walls.

Even though diesel engines, that is to say auto-ignition internal combustion engines, owing to the quality regulation on which they are based, inherently exhibit greater efficiency, that is to say lower fuel consumption, than Otto-cycle engines in which the load—as described above—is adjusted by means of throttling or quantity regulation with regard to the charging of the cylinders, there is, even in the case of diesel engines, potential for improvement and a demand for improvement with regard to fuel consumption and efficiency.

One concept for reducing fuel consumption, also in the case of diesel engines, is cylinder deactivation, that is to say the deactivation of individual cylinders in certain load ranges. The efficiency of the diesel engine in part-load operation can be improved, that is to say increased, by means of a partial deactivation, because, even in the case of the diesel engine, in the case of constant engine power the deactivation of at least one cylinder of a multi-cylinder internal combustion engine increases the load on the other cylinders still in operation, such that said cylinders operate in regions of higher loads, in which the specific fuel consumption is lower. The load collective in part-load operation of the diesel engine is shifted toward higher loads.

With regard to the wall heat losses, the same advantages are attained as in the case of the Otto-cycle engine, for which reason reference is made to the corresponding statements given.

In the case of diesel engines, the partial deactivation is also intended to prevent the fuel-air mixture from becoming too lean as part of the quality regulation in the event of decreasing load as a result of a reduction of the fuel quantity used.

The internal combustion engine to which the present disclosure relates is an auto-ignition internal combustion engine.

The multi-cylinder internal combustion engines with partial deactivation and the associated methods for operating said internal combustion engines described above have considerable potential for improvement.

If, for the purpose of the partial deactivation, the fuel supply to the deactivatable cylinders is stopped, that is to say discontinued, the deactivated cylinders continue to participate in the charge exchange if the associated valve drive of said cylinders is not deactivated or cannot be deactivated. The charge exchange losses thus generated lessen, and counteract, the improvements achieved with regard to fuel consumption and efficiency by means of the partial deactivation, such that the benefit of the partial deactivation is at least partially lost, that is to say the partial deactivation in fact yields an altogether less pronounced improvement.

To remedy the disadvantageous effects described above, it may be expedient for switchable or adjustable valve drives to be provided at the inlet side and at the outlet side, by means of which valve drives the deactivated cylinders are held closed, and thus no longer participate in the charge exchange, during the partial deactivation. In this way, a situation is also prevented in which the relatively cool charge air conducted through the deactivated cylinders reduces the enthalpy of the exhaust-gas flow provided to the turbine and causes the deactivated cylinders to rapidly cool down.

However, in the case of internal combustion engines supercharged by means of exhaust-gas turbocharging, such as the internal combustion engine to which the present disclosure relates, switchable valve drives can lead to further problems because the turbine of an exhaust-gas turbocharger is configured for a certain exhaust-gas flow rate, and thus generally also for a certain number of cylinders. If the valve drive of a deactivated cylinder is deactivated, the total mass flow through the cylinders of the internal combustion engine is initially reduced. The exhaust-gas mass flow conducted through the turbine decreases, and the turbine pressure ratio generally also decreases as a result. A decreasing turbine pressure ratio has the result that the charge pressure ratio likewise decreases, that is to say the charge pressure falls.

The charge pressure may be increased in order to supply more charge air to the cylinders that remain operational, because in the event of deactivation of at least one cylinder of a multi-cylinder internal combustion engine, the load on the other cylinders, which remain operational, increases, for which reason a greater amount of charge air and a greater amount of fuel may be supplied to said cylinders. The drive power available at the compressor for generating an adequately high charge pressure is dependent on the exhaust-gas enthalpy of the hot exhaust gases, which is determined significantly by the exhaust-gas pressure and the exhaust-gas temperature, and the exhaust-gas mass or the exhaust-gas flow.

In the case of Otto-cycle engines, by opening the throttle flap, the charge pressure can be easily increased in the load range relevant for partial deactivation. This possibility does not exist in the case of the auto-ignition diesel engine. The small charge-air flow may have the effect that the compressor operates beyond the surge limit.

The effects described above lead to a restriction of the practicability of the partial deactivation, specifically to a restriction of the engine speed range and of the load range in which the partial deactivation can be used. In the case of low charge-air flow rates, it is not possible, owing to inadequate compressor power or turbine power, for the charge pressure to be increased in accordance with demand.

The charge pressure during a partial deactivation, and thus the charge-air flow rate supplied to the cylinders that remain operational, could for example be increased by means of a small configuration of the turbine cross section and by means of simultaneous exhaust-gas blow-off, whereby the load range relevant for a partial deactivation would also be expanded again. This approach however has the disadvantage that the supercharging behavior is inadequate when all the cylinders are operated.

Against the background of that stated above, it is an object of the present disclosure to specify a method according to the preamble of claim 1 by means of which the partial deactivation is further optimized.

It is a further sub-object of the present disclosure to provide a supercharged auto-ignition internal combustion engine for carrying out such a method.

The first sub-object is achieved by means of a method for operating a supercharged auto-ignition internal combustion engine having at least one cylinder head comprising at least two cylinders, in which internal combustion engine each cylinder has at least one outlet opening for the discharge of the exhaust gases via an exhaust-gas discharge system and at least one inlet opening for the supply of charge air via an intake system and has a piston which is movable along a piston longitudinal axis between a bottom dead center BDC and a top dead center TDC, at least one exhaust-gas turbocharger is provided which comprises a turbine arranged in the exhaust-gas discharge system and a compressor arranged in the intake system, at least two cylinders are configured in such a way that said cylinders form at least two groups with in each case at least one cylinder, the at least one cylinder of a first group being a cylinder which is operational even in the event of a partial deactivation of the internal combustion engine, and the at least one cylinder of a second group being formed as a cylinder which can be switched in a load-dependent manner, and each inlet opening and each outlet opening of a cylinder is equipped with a valve drive with a valve which shuts off and opens up the associated opening, which method is characterized in that the cylinders are grouped in such a way that in each case two cylinders form a cylinder pair which comprises a cylinder of the first group and a cylinder of the second group, and during the partial deactivation, the at least one outlet opening of each deactivated cylinder of the second group is shut off by virtue of an associated at least partially variable valve drive being deactivated, at least one inlet opening of a deactivated cylinder of at least one cylinder pair is, as the piston moves toward bottom dead center, opened during the course of an intake stroke in order to feed charge air to the deactivated cylinder via the intake system, and at least one inlet opening of said deactivated cylinder is opened during the course of a compression stroke after the piston has passed through bottom dead center and before said piston reaches top dead center, the charge air discharged from the deactivated cylinder upon opening via the at least one inlet opening being supplied via a flow transfer duct to the operational cylinder of the cylinder pair.

In the method according to the present disclosure, during the partial deactivation, a deactivated cylinder is, contrary to its intended purpose, used as a pump for providing and supplying additional charge air to at least one cylinder that remains operational.

By means of this measure, the usability of the partial deactivation can be expanded or extended toward low engine speeds and low loads. According to the present disclosure, the amount of charge air supplied to the cylinders that remain operational during partial deactivation is no longer dependent exclusively on the provided compressor power or on the charge pressure that can be generated by the compressor. Rather, the amount of charge air supplied to a cylinder that is operational is increased or adjusted in accordance with demand by way of a deactivated cylinder.

For this purpose, cylinder pairs are formed, wherein according to the present disclosure, in each case one cylinder of the first group, that is to say a cylinder which remains operational during partial deactivation, and one cylinder of the second group, that is to say a cylinder which is deactivated during partial deactivation, form a cylinder pair. The deactivated cylinder of the second group serves, during the partial deactivation, as a charge air-supplying cylinder which provides additional charge air to the operational cylinder of the first group, for which reason the latter cylinder is also referred to and considered as charge air-receiving cylinder.

A flow transfer duct is provided which connects at least one inlet opening of the charge air-receiving cylinder to at least one inlet opening of the charge air-supplying cylinder in order for charge air from the deactivated, charge air-supplying cylinder to be introduced via the flow transfer duct into the charge air-receiving, operational cylinder of the cylinder pair.

In the auto-ignition internal combustion engine according to the disclosure, each outlet opening of a deactivatable cylinder of the second group is equipped with an at least partially variable valve drive, the outlet valve of which is at least switchable or deactivatable in order to deactivate, that is to say hold closed, the associated outlet opening of the deactivated cylinder during partial deactivation, in order that the charge air introduced into the deactivated cylinder does not escape, or is not discharged, at the outlet side.

The transfer of charge air at the inlet side from a charge air-supplying cylinder into a charge air-receiving cylinder may comprise a flow transfer duct and a coordinated opening and closing of the inlet openings involved both of the deactivated, charge air-supplying cylinder and of the charge air-receiving, operational cylinder, wherein the charge air-receiving cylinder is preferably operated with the timing used during normal operation, that is to say with unchanged timing.

Firstly, at least one inlet opening of a deactivated cylinder is opened as the piston moves toward the bottom dead center during the course of an intake stroke, in order for charge air to be introduced or drawn into the deactivated cylinder via the intake system. During the course of the subsequent compression stroke, at least one inlet opening of the deactivated cylinder is then opened, wherein the piston, moving toward top dead center, compresses the previously drawn-in charge air and, when at least one inlet opening opens, discharges said charge air out of the deactivated cylinder and supplies it via the flow transfer duct to the operational cylinder of the cylinder pair.

Surging of the compressor can be prevented. The load range in which the partial deactivation can be effectively used is expanded. The torque characteristic of the supercharged auto-ignition internal combustion engine during the partial deactivation is considerably improved.

With the method according to the disclosure, a method as per the preamble of claim 1 is presented, by means of which the partial deactivation is further optimized. The method according to the disclosure thereby achieves the first sub-object on which the present disclosure is based.

The auto-ignition internal combustion engine according to the present disclosure has at least two cylinders or at least two groups with in each case at least one cylinder. In this respect, internal combustion engines with three cylinders which are configured in two groups or in three groups with in each case one cylinder, or internal combustion engines with six cylinders which are configured in three groups with in each case two cylinders, are likewise internal combustion engines according to the present disclosure. Within the context of a partial deactivation, the three cylinder groups may be activated or deactivated in succession, whereby two-time switching may also be realized. The partial deactivation is thereby further optimized. The cylinder groups may also comprise a different number of cylinders.

In the internal combustion engine according to the present disclosure, cylinder pairs are formed. Here, it may be taken into consideration that a deactivated cylinder may belong to more than one cylinder pair, for example two cylinder pairs, and, as charge air-supplying cylinder, provides additional charge air to more than one charge air-receiving cylinder.

Further advantageous embodiments of the method according to the present disclosure will be explained in conjunction with the subclaims.

The time at which the at least one inlet opening of the deactivated cylinder is opened during the course of the compression stroke is dependent on multiple influential factors.

It is dependent firstly on whether the charge air-supplying cylinder has more than one inlet opening, and on how many inlet openings are connected to the charge air-receiving cylinder via the flow transfer duct. For example, if the charge air-supplying cylinder has two inlet openings, of which only one inlet opening is connected via the flow transfer duct to the charge air-receiving cylinder, then it may be provided that, before said inlet opening is opened during the course of the compression stroke, the other inlet opening is closed in order that the charge air can escape or be discharged only via the flow transfer duct.

Secondly, the time at which the at least one inlet opening of the deactivated cylinder is opened during the course of the compression stroke is also dependent on the magnitude of the mechanical or thermodynamic offset of the two cylinders of the cylinder pair, that is to say on whether said offset is for example 90, 120, 180, 240 or 360° CA. In this respect, both the crankshaft throw and the ignition sequence are of significance with regard to the grouping of the cylinders.

For example, embodiments of the method are advantageous in which the at least one inlet opening of the deactivated cylinder is opened later than 35° CA after bottom dead center BDC during the course of the compression stroke.

Embodiments of the method may also be advantageous in which the at least one inlet opening of the deactivated cylinder is opened later than 50° CA after bottom dead center BDC during the course of the compression stroke.

Embodiments of the method are also advantageous in which the at least one inlet opening of the deactivated cylinder is opened later than 70° CA after bottom dead center BDC during the course of the compression stroke.

Embodiments of the method may likewise be advantageous in which the at least one inlet opening of the deactivated cylinder is opened later than 90° CA after bottom dead center BDC during the course of the compression stroke.

Embodiments of the method are furthermore advantageous in which the at least one inlet opening of the deactivated cylinder is opened later than 110° CA after bottom dead center BDC during the course of the compression stroke.

Embodiments of the method are advantageous in which the at least one inlet opening of the deactivated cylinder is closed during the course of the compression stroke before the piston reaches top dead center TDC. This prevents the piston, as it runs through top dead center, from colliding with an open inlet valve.

For the operation of internal combustion engines in which each valve shuts off or opens up the associated opening, a valve which oscillates as a result of actuation realizing a valve lift Δh between an open position and a closed position and opening up the opening during an opening duration Δt, method variants are advantageous—inter alia for the reasons mentioned above—wherein the valve lift $\Delta h_{in}$ realized during the course of the intake stroke is at least three times greater than the valve lift $\Delta h_{comp}$ realized during the course of the compression stroke, where $\Delta h_{in}/\Delta h_{comp} \geq 4$ or $\Delta h_{in}/\Delta h_{comp} \geq 5$ or $\Delta h_{in}/\Delta h_{comp} \geq 7$. Analogous considerations apply to the opening duration Δt. Thus, by adjusting a timing and a height of the opening of the valve during the compression stroke of the charge air supplying cylinder, an amount of charge air provided to the charge air receiving cylinder may be adjusted.

The valve lifts $\Delta h_{in}$, $\Delta h_{comp}$ in the ratio above may not be performed by the same inlet valve.

A charge air-supplying cylinder, that is to say a cylinder of the second group, may have one inlet opening, which then serves both for the drawing-in of charge air during the course of the intake stroke and for the discharge of said charge air via the flow transfer duct during the course of the compression stroke.

A charge air-supplying cylinder may however also have more than one inlet opening. It is then possible for all of the inlet openings, or else only one inlet opening or a limited number or selection of inlet openings, to serve for the drawing-in of charge air during the course of the intake stroke and/or for the discharge of said charge air via the flow transfer duct during the course of the compression stroke.

In this respect, different method variants also emerge with regard to said at least one inlet opening of the charge air-supplying cylinder, and these will be discussed briefly below.

For the operation of an internal combustion engine in which each cylinder of the second group has two inlet openings for the supply of charge air via the intake system, method variants may be advantageous which are characterized in that, during the partial deactivation, a first inlet opening of a deactivated cylinder of at least one cylinder pair is, as the piston moves toward bottom dead center, opened during the course of an intake stroke in order to feed charge air to the deactivated cylinder via the intake system, and a second inlet opening of said deactivated cylinder is opened during the course of a compression stroke after the piston has passed through bottom dead center and before said piston reaches top dead center, the charge air discharged from the deactivated cylinder upon opening via the second inlet opening being supplied via the flow transfer duct to the operational cylinder of the cylinder pair.

In the present case, the charge air-supplying cylinder, that is to say the cylinder of the second group, has two inlet openings, of which one inlet opening serves for the drawing-in of charge air during the course of the intake stroke and another inlet opening serves for the discharge of said charge air via the flow transfer duct during the course of the compression stroke.

For the operation of an internal combustion engine in which each cylinder of the second group has at least two inlet openings for the supply of charge air via the intake system, method variants may be advantageous which are characterized in that, during the partial deactivation, all of the inlet openings of a deactivated cylinder of at least one cylinder pair are, as the piston moves toward bottom dead center, opened during the course of an intake stroke in order to feed charge air to the deactivated cylinder via the intake system, and one inlet opening of said deactivated cylinder is opened during the course of a compression stroke after the piston has passed through bottom dead center and before said piston reaches top dead center, the charge air discharged from the deactivated cylinder upon opening via the inlet opening being supplied via the flow transfer duct to the operational cylinder of the cylinder pair.

In the present case, the charge air-supplying cylinder, that is to say the cylinder of the second group, has more than one inlet opening, specifically at least two inlet openings, wherein all of the inlet openings serve for the drawing-in of charge air during the course of the intake stroke and only one inlet opening is used for the discharge of said charge air during the course of the compression stroke. For the operation of an internal combustion engine in which each cylinder of the second group has at least two inlet openings for the supply of charge air via the intake system, method variants may be advantageous which are characterized in that, during the partial deactivation, all of the inlet openings of a deactivated cylinder of at least one cylinder pair are, as the piston moves toward bottom dead center, opened during the course of an intake stroke in order to feed charge air to the deactivated cylinder via the intake system, and all of the inlet openings of said deactivated cylinder are opened during the course of a compression stroke after the piston has passed through bottom dead center and before said piston reaches top dead center, the charge air discharged from the deactivated cylinder upon opening via the inlet openings being supplied via the flow transfer duct to the operational cylinder of the cylinder pair.

In the present case, all of the inlet openings of a charge air-supplying cylinder, that is to say of a cylinder of the second group, serve both for the drawing-in of charge air during the course of the intake stroke and for the discharge of said charge air during the course of the compression stroke.

Embodiments of the method are advantageous in which the flow transfer duct is at least jointly formed by the intake system, wherein the flow transfer duct connects the at least one inlet opening, which is opened during the course of the compression stroke, of the deactivated cylinder to the operational cylinder of the cylinder pair, and said flow transfer duct is a duct which can be separated from the rest of the intake system at least during the compression stroke.

If, as already described, existing components, specifically the intake system or an inlet manifold and the inlet valves, are used to form the flow transfer duct and provide shut-off elements, it is possible for components, weight and structural space and therefore costs to be saved. In particular, the inlet valves can be used to open up and shut off the flow transfer duct at both sides. The flow transfer duct may connect at least one inlet opening of the deactivated cylinder to at least one inlet opening of the operational cylinder of the cylinder pair, and do so not necessarily in uninterrupted fashion but at least intermittently, specifically at least during the compression stroke when the flow transfer duct is open or opened up. Consequently, the flow transfer duct may be a duct which can be separated from the rest of the intake system at least during the compression stroke.

If the flow transfer duct can be connected to the rest of the intake system, the at least one inlet opening of the charge air-supplying, deactivated cylinder, which at least one inlet opening is opened during the course of the compression stroke for the purposes of transferring charge air, may also be used for the drawing-in of charge air during the course of the intake stroke.

Embodiments of the method are advantageous in which at least one inlet opening of the operational cylinder of the at least one cylinder pair is opened in order for the charge air discharged from the deactivated cylinder to be introduced into the operational cylinder. If appropriate, said at least one inlet opening of the operational cylinder is already open or opened when the at least one inlet opening of the charge air-supplying, deactivated cylinder is opened during the course of the compression stroke for the purpose of transferring charge air.

Embodiments of the method are advantageous in which at least one inlet opening of the operational cylinder of the at least one cylinder pair is opened during the course of an intake stroke as the piston moves toward bottom dead center, in order for the charge air discharged from the deactivated cylinder to be introduced into the operational cylinder. Then, the at least one inlet opening of the operational cylinder is opened during the intake process, whereby the transfer of charge air is assisted.

A charge air-receiving cylinder, that is to say a cylinder of the first group, may have one inlet opening, which is connected to the charge air-supplying cylinder in order for charge air to be transferred during the course of the compression stroke.

A charge air-receiving cylinder may however also have more than one inlet opening. It is then possible for all of the inlet openings, or else one inlet opening or a limited number or selection of inlet openings, to be connected to the charge air-supplying cylinder.

In this respect, different method variants also emerge with regard to said at least one inlet opening of the charge air-receiving cylinder, and these will be discussed briefly below.

For the operation of an internal combustion engine in which each cylinder of the first group has at least two inlet openings for the supply of charge air via the intake system, method variants may be advantageous which are characterized in that, during the partial deactivation, one inlet opening of the operational cylinder of the at least one cylinder pair is connected via the flow transfer duct to the deactivated cylinder in order for the charge air discharged from the deactivated cylinder to be introduced into the operational cylinder.

In this context, embodiments of the method are advantageous in which the at least one other inlet opening of the operational cylinder of the at least one cylinder pair, which at least one other inlet opening is not connected via the flow transfer duct to the deactivated cylinder, is closed before the charge air discharged from the deactivated cylinder is introduced into the operational cylinder.

For the operation of an internal combustion engine in which each cylinder of the first group has at least two inlet openings for the supply of charge air via the intake system, method variants may be advantageous which are characterized in that, during the partial deactivation, all of the inlet openings of an operational cylinder of the cylinder pair are connected via the flow transfer duct to the deactivated cylinder in order for the charge air discharged from the deactivated cylinder to be introduced into the operational cylinder.

The second sub-object on which the present disclosure is based, specifically that of providing an auto-ignition internal combustion engine for carrying out a method of a type described above, is achieved by means of a supercharged auto-ignition internal combustion engine having at least one cylinder head comprising at least two cylinders, in which internal combustion engine each cylinder has at least one outlet opening for the discharge of the exhaust gases via an exhaust-gas discharge system and at least one inlet opening for the supply of charge air via an intake system and has a piston which is movable along a piston longitudinal axis between a bottom dead center BDC and a top dead center TDC, at least one exhaust-gas turbocharger is provided which comprises a turbine arranged in the exhaust-gas discharge system and a compressor arranged in the intake system, at least two cylinders are configured in such a way that said cylinders form at least two groups with in each case at least one cylinder, the at least one cylinder of a first group being a cylinder which is operational even in the event of a partial deactivation of the internal combustion engine, and the at least one cylinder of a second group being formed as a cylinder which can be switched in a load-dependent manner, and each inlet opening and each outlet opening of a cylinder is equipped with a valve drive with a valve which shuts off and opens up the associated opening, the at least one outlet opening of each deactivatable cylinder of the second group being equipped with a deactivatable valve drive, and which internal combustion engine is characterized in that the cylinders are grouped in such a way that in each case two cylinders form a cylinder pair which comprises a cylinder of the first group and a cylinder of the second group, and during the partial deactivation, the cylinder of the second group, as charge air-supplying cylinder, providing additional charge air during the partial deactivation to the cylinder of the first group, as charge air-receiving cylinder, for which purpose a flow transfer duct which can be formed at least intermittently is provided which connects at least one inlet opening of the charge air-receiving cylinder to at least one inlet opening of the charge air-supplying cylinder in order for charge air to be introduced via the flow transfer duct from the deactivated, charge air-supplying cylinder into the charge air-receiving, operational cylinder of the cylinder pair.

That which has already been stated with regard to the method according to the present disclosure also applies to the internal combustion engine according to the present disclosure, for which reason reference is generally made at this juncture to the statements made above with regard to the method. The different auto-ignition internal combustion engines desire, in part, different method variants.

Embodiments of the supercharged auto-ignition internal combustion engine are advantageous in which the intake system at least jointly forms the flow transfer duct, wherein the flow transfer duct is in the form of a duct which can be separated from the intake system and which can also, by actuation of a shut-off element, be connected to the intake system via at least one opening.

The flow transfer duct may be jointly formed by walls of the intake system and/or of the inlet manifold. If appropriate, the method according to the present disclosure may include additional walls which may be introduced, that is to say incorporated, into the intake system and/or the inlet manifold.

The flow transfer duct may be a duct which can be separated from the rest of the intake system at least during the compression stroke. It is advantageous if the flow transfer duct can be connected to the rest of the intake system and the at least one inlet opening of the charge air-supplying, deactivated cylinder, which at least one inlet opening is opened during the course of the compression stroke for the purposes of transferring charge air, may also be used for the drawing-in of charge air during the course of the intake stroke. This applies in particular to the normal operation of the internal combustion engine after the ending of the partial deactivation. Then, at least one further inlet opening is available to the deactivatable cylinder for the charge exchange. The at least one shut-off element opens up the at least one opening or shuts off said opening and may for example be in the form of a flap.

Embodiments of the supercharged auto-ignition internal combustion engine are advantageous in which the two cylinders of a cylinder pair are cylinders arranged in each case adjacently in the at least one cylinder head. The spatial proximity of the two cylinders of a cylinder pair, that is to say their geometric proximity, has advantages for the method according to the present disclosure and for the internal combustion engine according to the present disclosure, because the distance between an inlet opening of the charge air-receiving cylinder and an inlet opening of the charge air-supplying cylinder is shortened. The flow transfer duct is of structurally simpler design, is of shorter length, and is of smaller volume. The latter in particular supports the transfer of charge air from the charge air-supplying cylinder into the charge air-receiving cylinder.

Embodiments of the supercharged auto-ignition internal combustion engine are advantageous which have at least one cylinder head and four cylinders in an in-line arrangement along the longitudinal axis of the at least one cylinder head, of which the two outer cylinders are cylinders of the first group, which are operational even during partial deactivation of the internal combustion engine, and the two inner cylinders are cylinders of the second group, which are switchable in load-dependent fashion, which embodiments are characterized in that in each case one outer cylinder and the adjacent inner cylinder form a cylinder pair.

If the auto-ignition internal combustion engine is operated with the ignition sequence 1-3-4-2, the ignition times, measured in ° CA, are as follows: 0-180-360-540. During the partial deactivation, the operational, outer cylinders, that is to say the first and the fourth cylinders, have a thermodynamic offset of 360° CA.

The deactivated third cylinder serves as a charge air-supplying cylinder for the fourth cylinder, which, as an operational cylinder, is a charge air-receiving cylinder. Also, the second cylinder serves as charge air-supplying cylinder for the first cylinder, which is likewise a charge air-receiving cylinder. The cylinders of the two cylinder pairs then—with a corresponding crankshaft throw configuration—each have a mechanical offset of 180° CA. When a charge air-supplying cylinder is in the compression stroke, the associated charge air-receiving cylinder is simultaneously in an intake stroke.

In the case of supercharged auto-ignition internal combustion engines in which each cylinder has two inlet openings for the supply of charge air via the intake system, embodiments are advantageous which are characterized in that in each case the inlet opening of a deactivatable cylinder of a cylinder pair, which deactivatable cylinder faces toward that cylinder of said cylinder pair which is operational even during partial deactivation of the internal combustion engine, is connectable via the flow transfer duct to the inlet opening of that cylinder of the cylinder pair which is operational even during partial deactivation of the internal combustion engine and which faces toward the deactivatable cylinder of the cylinder pair.

Above, the opposite inlet openings of the cylinders of a cylinder pair are connected to one another, or said inlet openings are connectable to one another via the flow transfer duct. In this way, the distance between the cylinders of a cylinder pair is substantially shortened, and the length of the flow transfer duct is minimized.

Embodiments of the supercharged auto-ignition internal combustion engine are advantageous in which each cylinder is equipped with a direct-injection means for the introduction of fuel.

Here, embodiments are advantageous in which each cylinder is equipped with an injection nozzle for the purposes of direct injection.

The fuel supply can be deactivated more quickly and more reliably, for the purposes of the partial deactivation, in the case of direct-injection auto-ignition internal combustion engines than in the case of internal combustion engines with intake pipe injection, in which fuel residues in the intake pipe can lead to undesired combustions in the deactivated cylinder.

Nevertheless, embodiments of the internal combustion engine may be advantageous in which an intake pipe injection means is provided for the purposes of supplying fuel.

Embodiments of the supercharged auto-ignition internal combustion engine are advantageous in which at least two exhaust-gas turbochargers are provided which each comprise a turbine arranged in the exhaust-gas discharge system and a compressor arranged in the intake system.

The torque characteristic of a supercharged internal combustion engine may be improved by means of multiple turbochargers arranged in parallel, that is to say by means of multiple turbines of relatively small turbine cross section arranged in parallel, turbines being activated successively with increasing exhaust-gas flow rate, similarly to sequential supercharging.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the characteristic map can advantageously be expanded, specifically both in the direction of smaller compressor flows and also in the direction of larger compressor flows.

Turning now to FIG. 1, it schematically shows a fragment of a first embodiment of the internal combustion engine during normal operation, partially in section.

Said internal combustion engine is a four-cylinder in-line engine with direct injection, in which the four cylinders 1, 2, 3, and 4 are arranged along the longitudinal axis of the cylinder head, that is to say in a line, and are equipped in each case with an injector for injecting fuel.

Each cylinder 1, 2, 3, and 4 has two inlet openings 3$a$1, 3$a$2, 4$a$1, and 4$a$2 for the supply of charge air via an intake system 7, wherein each inlet opening 3$a$1, 3$a$2, 4$a$1, and 4$a$2 is adjoined by an intake line 5$a$1, 5$a$2, 6$a$1, and 6$a$2, respectively. The intake lines 5$a$1, 5$a$2, 6$a$1, and 6$a$2 merge to form an overall intake line, thus forming an inlet manifold 7. For the discharging of the exhaust gases via an exhaust-gas discharge system, each cylinder 1, 2, 3, and 4 is equipped with two outlet openings 3$b$, 4$b$. Furthermore, each cylinder 1, 2, 3, and 4 has a piston which is movable along a piston longitudinal axis between a bottom dead center BDC and a top dead center TDC (not illustrated).

For the purposes of supercharging, the internal combustion engine is equipped with at least one exhaust-gas turbocharger which comprises a turbine arranged in the exhaust-gas discharge system and a compressor arranged in the intake system 7.

The four cylinders 1, 2, 3, and 4 are configured and form two groups, wherein the outer cylinder 1 and the inner cylinder 2 form a first group, and the outer cylinder 4 and inner cylinder 3 form a second group. The cylinders 2 and 3 are load-dependently switchable cylinders 2 and 3 which are deactivated during a partial deactivation.

Each inlet opening 3$a$1, 3$a$2, 4$a$1, and 4$a$2 and each outlet opening 3$b$ and 4$b$ is equipped with a valve drive comprising a valve which shuts off and opens up the associated opening 3$a$1, 3$a$2, 4$a$1, 4$a$2, 3$b$, and/or 4$b$. The two outlet openings 3$b$ of each deactivatable cylinder 2 and 3 of the first and second groups are equipped with a deactivatable valve drive. In one example, the deactivatable valve drive is a hydraulic lash adjuster.

The four cylinders 1, 2, 3, and 4 are furthermore grouped such that each group comprises a charge air supplying cylinder and a charge air receiving cylinder. Furthermore, the cylinders are adjacent one another to reduce packaging restraints. Thus, cylinder 1 and 2 may form a first group and cylinders 3 and 4 may form a second group. In each case one outer cylinder 1, 4 and the adjacent inner cylinder 2, 3 form a cylinder pair.

For the transfer of charge air, a flow transfer duct 8 which can be separated from the rest of the intake system 7, via a shut-off valve 8$b$, is provided, which flow transfer duct 8 in the present case connects the first inlet opening 4$a_1$ of the charge air-receiving fourth cylinder 4 to the second inlet opening 3$a_2$ of the charge air-supplying third cylinder 3, or can realize such a connection during the partial deactivation, in order for charge air from the deactivated, charge air-supplying third cylinder 3 to be introduced via the flow transfer duct 8 into the operational, charge air-receiving fourth cylinder 4 of the cylinder pair.

FIG. 2A schematically shows a fragment of the internal combustion engine illustrated in FIG. 1 during the partial deactivation (e.g., variable displacement engine (VDE) mode), partially in section. It is sought merely to explain the additional features in relation to FIG. 1, for which reason reference is made otherwise to FIG. 1. As such, components previously introduced are similarly numbered in subsequent figures.

During the partial deactivation, the outlet openings 3$b$ of the deactivated third cylinder 3 of the second group are shut off by virtue of the associated at least partially variable valve drives being deactivated.

The first inlet opening 3$a$1 of the deactivated third cylinder 3 is opened as the piston moves toward the bottom dead center (BDC) during the course of an intake stroke, in order to feed charge air to the deactivated third cylinder 3 via the intake system 7 and the first intake line 5$a$1 (see also FIG. 2$b$-EV3,1). Subsequently, the second inlet opening 3$a$2 of said deactivated third cylinder 3 is opened during the course of the subsequent compression stroke,—while maintaining the first inlet opening 3$a$1 closed, after the piston has passed through bottom dead center and before said piston reaches top dead center (further described below with respect to FIG. 2B). Here, the charge air discharged from the deactivated third cylinder 3 upon the opening of the second inlet opening 3$a$2 is supplied via the flow transfer duct 8 to the operational fourth cylinder 4 via the first inlet opening 4$a$1 being open.

In the present case, the intake system 7 jointly forms the flow transfer duct 8, wherein additional walls are incorporated into the intake system 7 or into the intake manifold 7. The flow transfer duct 8 may be a duct which can be separated from the rest of the intake system 7 at least during the compression stroke. The flow transfer duct 8 may however also be a duct which is separable or separated from the rest of the intake system 7 throughout the partial deactivation.

The flow transfer duct 8 can be connected to the rest of the intake system 7 via an opening 8A by actuation of a shut-off element 8$b$, the second inlet opening 3$a$2 of the deactivated, charge air-supplying third cylinder 3, which is opened during the course of the compression stroke for the purposes of transferring charge air, may also be used for the drawing-in of charge air during the course of the intake stroke. Then, a further inlet opening 3$a$2 is available to the deactivatable cylinder 3 for the intake process or for the charge exchange. As such, inlet opening 4$a$1 is then likewise available for the charge exchange.

Thus, FIGS. 1 and 2A depict, in one example, a system comprising: an in-line four cylinder diesel engine where each cylinder comprises at least two inlet valves and at least two outlet valves, the engine further comprising an intake manifold with a number of inlet runners equal to a total number of inlet valves of the cylinders. The system further comprises a first group of cylinders comprising a first outer cylinder and a second inner cylinder adjacent to the first cylinder; and a first flow transfer duct fluidly coupling at least one inlet valve of the first outer cylinder to at least one inlet valve of the second inner cylinder. A second group of cylinders comprising a third inner cylinder and a fourth outer cylinder adjacent the third inner cylinder, and a second flow transfer duct fluidly coupling at least one inlet valve of the third inner cylinder to at least one inlet valve of the fourth outer cylinder. The system may further comprise a valve drive configured to adjust a position of the inlet and outlet valves of the cylinders, the valve drive further configured to deactivate at least one cylinder of each of the first and second cylinder groups.

The first flow transfer duct fluidly couples proximal inlet valves of the first outer cylinder and the second inner cylinder, and where the second flow transfer duct fluidly couples proximal inlet valves of the third inner cylinder and the fourth outer cylinder, the first flow transfer duct being fluidly separated from the second flow transfer duct. The first and second flow transfer ducts comprise first and second shut-off valves configured to fluidly separate the first and second flow transfer ducts from the intake manifold and inlet runners, respectively. The second inner cylinder and the third inner cylinder are deactivatable cylinders, and where the second and third inner cylinders are charge-air supplying cylinders to the first outer cylinder and the fourth outer cylinder, respectively, when the second and third inner cylinders are deactivated. The second and third inner cylinders generate charge air during respective compression strokes, and where at least one inlet valve of each of the second and third inner cylinders is at least partially opened during the compression strokes of the cylinders to discharge charge air from the cylinder to first and second flow transfer ducts respectively. The inlet valves of the second and third inner cylinders opens to a first height during an intake stroke of the second and third inner cylinders, and where the inlet valves of the second and third inner cylinders opens to a second height during a compression stroke of the second and third inner cylinders when the second and third inner cylinders are deactivated, where the first height is greater than the second height.

The system may comprise a controller with computer-readable instructions for deactivating at least the second inner cylinder of the first cylinder group in response to an engine load being less than or equal to a moderate load, and opening an inlet valve of the second inner cylinder fluidly coupled to the first flow transfer duct during a compression stroke of the second inner cylinder in conjunction with an intake stroke of the first outer cylinder, and where charge air flows from the second inner cylinder, into the first flow transfer duct, through an inlet valve of the first outer cylinder, and into the first outer cylinder.

FIG. 2B shows, in a diagram, the valve travel curves $EV_{3,1}$, $EV_{3,2}$ of the inlet valves of the third cylinder 3 of the internal combustion engine illustrated in FIG. 1 during the partial deactivation, and the valve travel curve $EV_4$ of the inlet valves of the fourth cylinder 4.

The at least one inlet opening and at least one outlet opening oscillate between open and closed positions, and where a valve lift $\Delta h$ may be measured between an open position and a closed position during an oscillating duration $\Delta t$. The valve lift $\Delta h_{in}$, which during the course of the intake stroke is realized by the inlet valve of the first inlet opening $3a_1$ of the third cylinder 3, is more than seven times greater than the valve lift $\Delta h_{comp}$ realized by the inlet valve of the second inlet opening $3a_2$ of the third cylinder 3 during the course of the compression stroke.

Also indicated are the top dead center $TDC_3$ of the third cylinder and the top dead center $TDC_4$ of the fourth cylinder.

FIG. 3 schematically shows a fragment of a second embodiment of the internal combustion engine, partially in section. It is sought merely to explain the additional features in relation to the preceding figures, for which reason reference is made otherwise to the statements above.

Said internal combustion engine is a three-cylinder in-line engine in which the three cylinders 11, 12, and 13 are arranged along the longitudinal axis of the cylinder head, that is to say in a line. Each cylinder 11, 12, and 13 has two inlet openings $11a_1$, $11a_2$, $12a_1$, $12a_2$, $13a_1$, and $13a_2$ for the supply of charge air via the intake system 7, respectively, wherein each inlet opening $11a_1$, $11a_2$, $12a_1$, $12a_2$, $13a_1$, and $13a_2$ is adjoined by an intake line. The intake lines (e.g., intake runners) merge into a plenum 14 so as to form an overall intake line 7a, thus forming an inlet manifold 7.

The three cylinders 11, 12, and 13 are configured and form two groups, the two outer cylinders 11, 13 forming a first group, the cylinders 11, 13 of which are operational even during partial deactivation of the internal combustion engine, and the inner cylinder 12 forming a second group, that is to say being formed as a load-dependently switchable cylinder 12, which is deactivated during a partial deactivation.

The three cylinders 11, 12, and 13 are furthermore grouped, specifically in such a way that in each case two cylinders of cylinders 11, 12, and 13 form one cylinder pair, wherein one cylinder pair comprises one cylinder 11, 13 of the first group and a cylinder 12 of the second group. The deactivated cylinder 12 of the second group, as charge air-supplying cylinder 12, provides additional charge air to both cylinders 11, 13 of the first group, as charge air-receiving cylinders 11, 13, during the partial deactivation. The inner, deactivated cylinder 12 in the present case belongs to more than one cylinder pair, specifically to two cylinder pairs, and, as charge air-supplying cylinder 12, provides additional charge air alternately to both outer cylinders 11, 13, as charge air-receiving cylinders 11, 13.

For the transfer of charge air, a flow transfer duct 8 which can be separated from the rest of the intake system 7 is provided, which flow transfer duct in the present case is jointly formed by the plenum 14 of the intake system 7 and connects at least the first inlet opening $11a_1$, $13a_1$ of a charge air-receiving cylinder 11, 13 to the second inlet opening $12a_2$ of the charge air-supplying second cylinder 12, or can realize such a connection during the partial deactivation, in order for charge air from the deactivated, charge air-supplying second cylinder 12 to be introduced via the flow transfer duct 8 into an operational, charge air-receiving cylinder 11, 13 of the cylinder pair.

It is also the case in the embodiment illustrated in FIG. 3 that the flow transfer duct 8 is a duct that can be separated from the rest of the intake system 7 during the compression stroke of the charge air supplying cylinder. For this purpose, a check valve 8C which serves as a shut-off element 8B is arranged in the overall intake line 7A, which check valve can separate the flow transfer duct from the rest of the intake system 7, that is to say opens during the course of the intake stroke for the purposes of drawing in charge air and closes during the course of the compression stroke for the purposes of transferring charge air.

The three-cylinder in-line engine may be equipped with a crankshaft, the three crankshaft throws of which are arranged on the crankshaft so as to be arranged in each case with a 120° offset in a circumferential direction, wherein the ignition in the cylinders 11, 12, and 13 is initiated with an interval of 240° CA.

The crankshaft throws of the three cylinders 11, 12, and 13 may however also be arranged on the crankshaft so as to be offset with respect to one another by 180°, wherein the crankshaft throw of the inner cylinder 12 is arranged on the crankshaft so as to be offset through 180° in the circumferential direction in relation to the crankshaft throws of the outer cylinders 11, 13. The cylinders may be ignited in the sequence 3-2-1, such that, proceeding from the third cylinder, the ignition times of the three cylinders, measured in ° CA, are as follows: 0-180-360. The ignition of the third cylinder again is initiated at 720° CA. During partial deactivation, this yields an ignition interval of 360° CA.

Thus, an inline three cylinder engine may comprise first, second, and third cylinders, where each cylinder comprises two separate intake valves. It will be appreciated by someone skilled in the art that each cylinder may comprise less than two intake valves (e.g., one intake valve) or greater than two intake valves (e.g., three or more intake valves). A deactivated cylinder may receive intake air through a first intake valve during an intake stroke, while a second intake valve remains closed. The deactivated cylinder may discharge charge air by opening the second intake valve during a compression stroke, while the first intake valve remains closed. Additionally or alternatively, the first and second intake valves may operate similarly at the same time. For example, the deactivated cylinder may receive intake air through open first and second intake valves during the intake stroke while discharging charge air through open first and second intake valve during the compression stroke. Furthermore, since the three cylinders share an intake manifold, the activated cylinders may both receive a portion of the charge air discharged from the deactivated cylinder during respective intake strokes. As such, it will be appreciated that charge air discharged from the deactivated cylinder is received by the remaining activated cylinders during intake strokes of the activated cylinders. Additionally, the intake strokes of the activated cylinders may be offset such that the activated cylinders receive a portion of charge air discharged from the deactivated cylinder at different times. Thus, a first of the activated cylinders may receive charge air before a second of the activated cylinders based on a CA offset between the intake strokes of the first and second active cylinders.

Referring now to FIG. 4, it shows a schematic depiction of a spark ignition internal combustion engine 10. Engine 10 may be controlled at least partially by a control system including controller 100 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48 and exhaust passage 58. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In the example of FIG. 4, intake valve 52 and exhaust valve 54 may be controlled by cam actuation via respective cam actuation systems 51 and 53. Cam actuation systems 51 and 53 may each include one or more cams mounted on one or more camshafts (not shown in FIG. 1) and may utilize one or more of cam profile switching (CPS), variable cam timing (VCT), variable valve timing (VVT) and/or variable valve lift (VVL) systems that may be operated by controller 100 to vary valve operation. The angular position of intake and exhaust camshafts may be determined by position sensors 55 and 57, respectively. In alternate embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 100 via electronic driver 99. In this manner, fuel injector 66 provides what is known as direct injection of fuel into combustion chamber 30. The fuel injector may be mounted in the side of the combustion chamber 30 or in the top of the combustion chamber 30, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Engine 10 may further include a compression device such as a turbocharger or supercharger including at least a compressor 94 arranged along intake passage 42. For a turbocharger, compressor 94 may be at least partially driven by an exhaust turbine 92 (e.g. via a shaft) arranged along exhaust passage 58. Compressor 94 draws air from intake passage 42 to supply boost chamber 46. Exhaust gases spin exhaust turbine 92 which is coupled to compressor 94 via shaft 96. For a supercharger, compressor 94 may be at least partially driven by the engine and/or an electric machine, and may not include an exhaust turbine. Thus, the amount of compression provided to one or more cylinders of the engine via a turbocharger or supercharger may be varied by controller 100.

A wastegate 69 may be coupled across exhaust turbine 92 in a turbocharger. Specifically, wastegate 69 may be included in a bypass passage 67 coupled between an inlet and outlet of the exhaust turbine 92. By adjusting a position of wastegate 69, an amount of boost provided by the exhaust turbine may be controlled.

Intake manifold 44 is shown communicating with throttle 62 having a throttle plate 64. In this particular example, the position of throttle plate 64 may be varied by controller 100 via a signal provided to an electric motor or actuator (not shown in FIG. 4) included with throttle 62, a configuration that is commonly referred to as electronic throttle control (ETC). Throttle position may be varied by the electric motor via a shaft. Throttle 62 may control airflow from intake boost chamber 46 to intake manifold 44 and combustion chamber 30 (and other engine cylinders). The position of throttle plate 64 may be provided to controller 100 by throttle position signal TP from throttle position sensor 158.

Exhaust gas sensor 126 is shown coupled to exhaust manifold 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 58 downstream of exhaust gas sensor 126 and exhaust turbine 92. Device 70 may be a three way catalyst (TWC), NOx trap, various other emission control devices, or combinations thereof.

An exhaust gas recirculation (EGR) system (not shown) may be used to route a desired portion of exhaust gas from exhaust passage 58 to intake manifold 44. Alternatively, a portion of combustion gases may be retained in the combustion chambers, as internal EGR, by controlling the timing of exhaust and intake valves.

Controller 100 is shown in FIG. 4 as a microcomputer including: microprocessor unit 102, input/output ports 104, read-only memory 106, random access memory 108, keep alive memory 110, and a conventional data bus. Controller 100 commands various actuators such as throttle plate 64, wastegate 69, fuel injector 66, and the like. Controller 100 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a profile ignition pickup signal (PIP) from Hall effect sensor 118 (or other type) coupled to crankshaft 40; a measurement of air mass entering the engine from mass airflow sensor 120; and a measurement of throttle position from sensor 158. Barometric pressure may also be sensed (sensor not shown) for processing by controller 100. In one embodiment, crankshaft sensor 118, which may be used as an engine speed sensor, may produce a predetermined number of equally spaced pulses for every revolution of the crankshaft from which engine speed (RPM) can be determined. Such pulses may be relayed to controller 100 as a profile ignition pickup signal (PIP) as mentioned above.

As described above, FIG. 4 merely shows one cylinder of a multi-cylinder engine (e.g., internal combustion engine shown in FIG. 1, 2A, or 3), and that each cylinder has its own set of intake/exhaust valves, fuel injectors, etc. Also, in the example embodiments described herein, the engine may operate in non-VDE or VDE modes. A non-VDE mode may include firing all the cylinders of the engine while the VDE modes include deactivating at least one cylinder of the engine. The deactivated cylinder may be operated as a charge air supplying cylinder during some VDE modes.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g., when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g., when cylinder 30 is at its smallest volume) is typically referred to by those of skill in the art as top dead center (TDC). In a process hereinafter referred to as injection, fuel is introduced into the combustion chamber. In a process hereinafter referred to as compression, the injected fuel is ignited by compression, resulting in combustion. Additionally or alternatively compression may be used to ignite the air/fuel mixture. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, early intake valve closing, or various other examples.

In one example, an engine comprising a cylinder group having a first cylinder and a second cylinder adjacent each other. The second cylinder group may be configured to be deactivated during some engine operating conditions. When the second cylinder group is deactivated, it may be used to supply additional charge air, along with charge air from the compressor, to the first cylinder. A flow transfer duct may fluidly couple an intake valve of the second cylinder to the first cylinder while preventing charge air from the compressor to flow into the second cylinder. The flow transfer duct further comprises a valve for fluidly separating the flow transfer duct from the intake manifold during deactivation of the second cylinder. As such, the first cylinder may be undergoing an intake stroke simultaneously to a compression stroke of the second cylinder. During the intake stroke of the first cylinder, all of the intake valves of the first cylinder may be in a lifted (e.g., open) position, where at least one of the intake valves corresponds to the flow transfer duct. During the compression stroke of the second cylinder, the intake valve of the second cylinder corresponding to the flow transfer duct may be moved to at least a partially lifted (e.g., slightly open) position. In one example, the partially lifted position is a percentage of the lifted position (e.g., 25%). Additionally, the opening of the intake valve of the second cylinder may be delayed during the compression stage such that the intake valve open following a threshold crankshaft rotation following a BDC position of the crankshaft. In one example, the threshold crankshaft rotation is a range, where the range is 35 to 120 CA. Thus, as the first cylinder is firing, the second cylinder is configured to provide compressed air by allowing air drawn during the intake stroke to be compressed by a piston of the second cylinder and delivered to the first cylinder via a flow transfer duct. It will be appreciated by those skilled in the art that the engine may comprise more than two cylinders. For example, if an engine is an in-line four cylinder engine, the engine may comprise two cylinder groups, where each of the cylinder groups comprises adjacent inner and outer cylinders along with a flow transfer duct fluidly coupling the adjacent cylinders.

In one example, a method comprises deactivating a first cylinder of a pair of adjacent first and second cylinders, where each cylinder of the pair of cylinders comprises two inlet valves and two outlet valves. The method further comprises flowing intake air from an intake manifold to the second cylinder during an intake stroke of the second cylinder and compressing intake air in the second cylinder during a compression stroke of the second cylinder, and where at least one inlet valve of the two inlet valves of the second cylinder is at least partially opened during the compression stroke. The method further comprising discharging charge air from the second cylinder to the first cylinder via a flow transfer duct fluidly coupling the at least one inlet valve of the second cylinder to a nearest inlet valve of the first cylinder. The method further comprising where the flow transfer duct comprises a shut-off valve configured to fluidly separate the flow transfer duct from the intake manifold when in a closed position, and where the shut-off valve is moved to the closed position when the second cylinder is deactivated. The method further comprising where the flow transfer duct comprises a shut-off valve configured to fluidly separate the flow transfer duct from the intake manifold when in a closed position, and where the shut-off valve is moved to the closed position when the at least one inlet valve of the two inlet valves of the second cylinder is at least partially opened during the compression stroke of the second cylinder. The method further comprising where the first cylinder receives charge air from the second cylinder through a first inlet valve and where the first cylinder receives charge air from the intake manifold through a second inlet valve, and where the first inlet valve is fluidly coupled to the flow transfer duct.

In another example, a method comprises responsive to deactivating a cylinder, directly coupling intake ports of the cylinder and an adjacent cylinder via a shut-off valve and flowing compressed intake air directly between the cylinders via the coupled intake ports. The method further includes where the coupled intake port are a first group of intake ports, wherein the cylinder and the adjacent cylinder further comprise a second group of intake ports. The second group of intake ports are farther apart from one another than the first group. The method includes flowing compressed air between the cylinder and the adjacent cylinder when one of the cylinder or the adjacent cylinder is deactivated.

Turning now to FIG. 5, it shows an example routine 500 for determining a mode of engine operation in a vehicle based on engine load of a four cylinder engine (e.g., four cylinder engine comprising cylinders 1, 2, 3, and 4 as shown in FIG. 1). Specifically, a two-cylinder VDE mode, a three-cylinder VDE mode, or a non-VDE mode of operation may be selected based on engine loads. Further, transitions between these modes of operation may be determined based on changes in engine loads. Routine 500 may be controlled by a controller such as controller 100 of engine 10, shown in FIG. 4. Instructions for carrying out method 500 and the rest of the methods included herein may be executed by a controller based on instructions stored on a memory of the controller and in conjunction with signals received from sensors of the engine system, such as the sensors described above with reference to FIG. 4. The controller may employ engine actuators of the engine system to adjust engine operation, according to the methods described below. In one example, the controller may adjust At 502, the routine 500 includes estimating and/or measuring engine operating conditions. These conditions may include, for example, engine speed, engine load, desired torque (for example, from a pedal-position sensor), manifold pressure (MAP), mass air flow (MAF), boost pressure, engine temperature, spark timing, intake manifold temperature, knock limits, etc. At 504, the routine includes determining a mode of engine operation based on the estimated engine operating conditions. For example, engine load may be a significant factor to determine engine mode of operation which includes two-cylinder VDE mode, three-cylinder VDE mode or non-VDE mode (also termed full-cylinder mode). In another example, desired torque may also determine engine operating mode. A higher demand for torque may include operating the engine in non-VDE or four-cylinder mode. A lower demand for torque may enable a transition of engine operation to a VDE mode.

At 506, therefore, routine 500 may determine if high (or very high) engine load conditions exist. For example, the engine may be experiencing higher loads as the vehicle ascends a steep incline. In another example, an air-conditioning system may be activated thereby increasing load on the engine. If it is determined that high engine load conditions exist, routine 500 continues to 508 to activate all cylinders and operate in the non-VDE mode. All four cylinders may be operated during the non-VDE mode. As such, a non-VDE mode may be selected during very high engine loads and/or very high engine speeds.

In one example, the non-VDE mode includes firing all the cylinders of the engine and opening one or more valve in one or more flow transfer duct (e.g., shut-off element 8B in flow transfer duct 8 for cylinders 3 and 4 and a separate shut-off element in a flow transfer duct for cylinders 1 and 2 (not shown) in the embodiment of FIG. 1). Additionally, one or more intake valves of a charge air supplying cylinder remain in a fully closed position during a respective compression stroke of the charge air supplying cylinder. As described above, the charge air supplying cylinder is a deactivated cylinder fluidly coupled to a firing cylinder via a flow transfer duct, where the charge air supplying cylinder is configured to provide charge air to the firing cylinder. As such, charge air provided to the firing cylinders may only be provided from a compressor (e.g., compressor 94 of FIG. 4).

Further, at 510, the four cylinders may be fired in the following sequence: 1-3-2-4 with cylinders 2, 3, and 4 firing about 240 CA degrees apart, and cylinder 1 firing about halfway between cylinder 4 and cylinder 3. As described earlier, when all cylinders are activated, a first cylinder (cylinder 3) may be fired at 120 degrees of crank rotation after cylinder 1, a second cylinder (cylinder 2) may be fired at 240 degrees of crank rotation after firing the first cylinder, a third cylinder (cylinder 4) may be fired at 240 degrees of crank rotation after firing the second cylinder, and a fourth cylinder (cylinder 1) may be fired at 120 degrees of crank rotation after firing the third cylinder. Routine 500 may then proceed to 526.

If at 506, it is determined that high engine load conditions do not exist, routine 500 progresses to 512 where it may determine if low engine load conditions are present. For example, the engine may be operating at a light load when cruising on a highway. In another example, lower engine loads may occur when the vehicle is descending an incline. If low engine load conditions are determined at 512, routine 500 continues to 516 to operate the engine in a two-cylinder VDE mode. Additionally, at 518, the two activated cylinders (cylinders 1 and 2) may be fired at 360 crank angle degree intervals.

During the two-cylinder VDE mode, cylinders 2 and 3 may be deactivated while cylinders 1 and 4 remain operational (e.g., active) for an inline four cylinder combustion engine, as shown in FIG. 1. As a result, cylinders 2 and 3 may operate as charge air supplying cylinders while cylinders 1 and 4 are charge air receiving cylinders. In one example, intake air drawn into cylinder 2 may be compressed during a compression stroke of cylinder 2. During the compression stroke, a shut-off valve in a first flow transfer duct fluidly coupling at least one intake valve of cylinder 2 to cylinder 1 may be in a closed position such that the first flow transfer duct is fluidly separated from a remainder of an intake system. The at least one intake valve of cylinder 2 is opened before the compression stroke is done (e.g., at a TDC position) to supply charge air to cylinder 1. In this way, the at least partially charge air may exit cylinder 2 and flow through the flow transfer duct due to the shut-off valve being in the closed position. Similarly, intake air drawn into cylinder 3 may be compressed during a compression stroke of cylinder 3, before the at least partially charged intake air is delivered to operational cylinder 4. An intake valve of one or more intake valves of cylinder 3 may be fluidly coupled to cylinder 4 via a second, separate flow transfer duct, where the intake valve may open during the compression stroke (e.g., 30 to 120 CA following the piston passing BDC toward TDC) to admit charged air into the flow transfer duct to be provided to operational cylinder 4 during its intake stroke. The first and second flow transfer ducts are fluidly separated such that charge air from cylinder 2 does not enter the second flow transfer duct. Likewise, charge air from cylinder 3 does not enter the first flow transfer duct. Routine 500 may then proceed to 526.

In this way, two-cylinder VDE for a four cylinder in-line engine may comprise two cylinder groups, each comprising an operational cylinder adjacent a deactivated cylinder with separate flow transfer ducts fluidly coupling the operational cylinder to the adjacent deactivated cylinder. The flow transfer ducts comprise a shut-off valve for fluidly sealing the flow transfer duct from an intake manifold such that air in the flow transfer duct when the shut-off valve is in the closed position may only comprise of air from a deactivated cylinder.

If it is determined that low engine load conditions are not present, routine 500 progresses to 520 where it may determine medium engine load operation. Next, at 522, the engine may be operated in a three-cylinder VDE mode wherein cylinder 3 may be deactivated and cylinders 1, 2, and 4 may be activated. Alternatively, cylinder 2 may be deactivated and cylinders 1, 3, and 4 may be activated. Further, at 524, the three activated cylinders may be fired 240 crank angle degrees apart such that the engine experiences combustion events at 240 crank angle degree intervals.

As an example, when cylinder 3 is deactivated, fuel is no longer delivered to cylinder 3. Furthermore, cylinder 3 is operated as a charge air supplying cylinder, wherein intake air in cylinder 3 is flown through a flow transfer duct to cylinder 4 during the compression stroke of cylinder 3, which is simultaneous to an intake stroke of cylinder 4. In this way, charge air generated by cylinder 3 mixes with charge air from a compressor inside cylinder 4. Thus, more charge air may be provided to an operational cylinder adjacent a deactivated cylinder when the engine is in a reduced load.

Once an engine operating mode is selected and engine operation in selected mode is commenced (e.g., at one of 510, 516 or 524), routine 500 may determine at 526 if a change in engine load is occurring. For example, the vehicle may complete ascending the incline to reach a more level road thereby reducing the existing high engine load to a medium load (or low load). In another example, the air-conditioning system may be deactivated. In yet another example, the vehicle may accelerate on the highway to pass other vehicles so that engine load may increase from a light load to a medium or high load. If it is determined at 526 that a change in load is not occurring, routine 500 continues to 528 to maintain engine operation in the selected mode. Else, engine operation may be transitioned at 530 to a different mode based on the change in engine load. Mode transitions will be described in detail in reference to FIG. 6 which shows an example routine 600 for transitioning from an existing engine operation mode to a different operation mode based on determined engine loads.

At 532, various engine parameters may be adjusted to enable a smooth transition and reduce torque disturbance during transitions. For example, it may be desired to maintain a driver-demanded torque at a constant level before, during, and after the transition between VDE operating modes. As such, when cylinders are reactivated, the desired air charge and thus the manifold pressure (MAP) for the reactivated cylinders may decrease (since a larger number of cylinders will now be operating) to maintain constant engine torque output. To attain the desired lower air charge, the throttle opening may be gradually reduced during the preparing for transition. At the time of the actual transition, that is, at the time of cylinder reactivation, the throttle opening may be substantially reduced to attain the desired airflow. This allows the air charge to be reduced during the transition without causing a sudden drop in engine torque, while allowing the air charge and MAP levels to be immediately reduced to the desired level at the onset of cylinder reactivation. Additionally or alternatively, spark timing may be retarded to maintain a constant torque on all the cylinders, thereby reducing cylinder torque disturbances. When sufficient MAP is reestablished, spark timing may be restored and throttle position may be readjusted. In addition to throttle and spark timing adjustments, valve timing may also be adjusted to compensate for torque disturbances.

It should be noted that when the relative speed (or loads or other such parameters) is indicated as being high or low, the indication refers to the relative speed compared to the range of available speeds (or loads or other such parameters, respectively). Thus, low engine loads or speeds may be lower relative to medium and higher engine loads and speeds, respectively. High engine loads and speeds may be higher relative to medium (or moderate) and lower engine loads and speeds respectively. Medium or moderate engine loads and speeds may be lower relative to high or very high engine loads and speeds, respectively. Further, medium or moderate engine loads and speeds may be greater relative to low engine loads and speeds, respectively.

Figure 6:
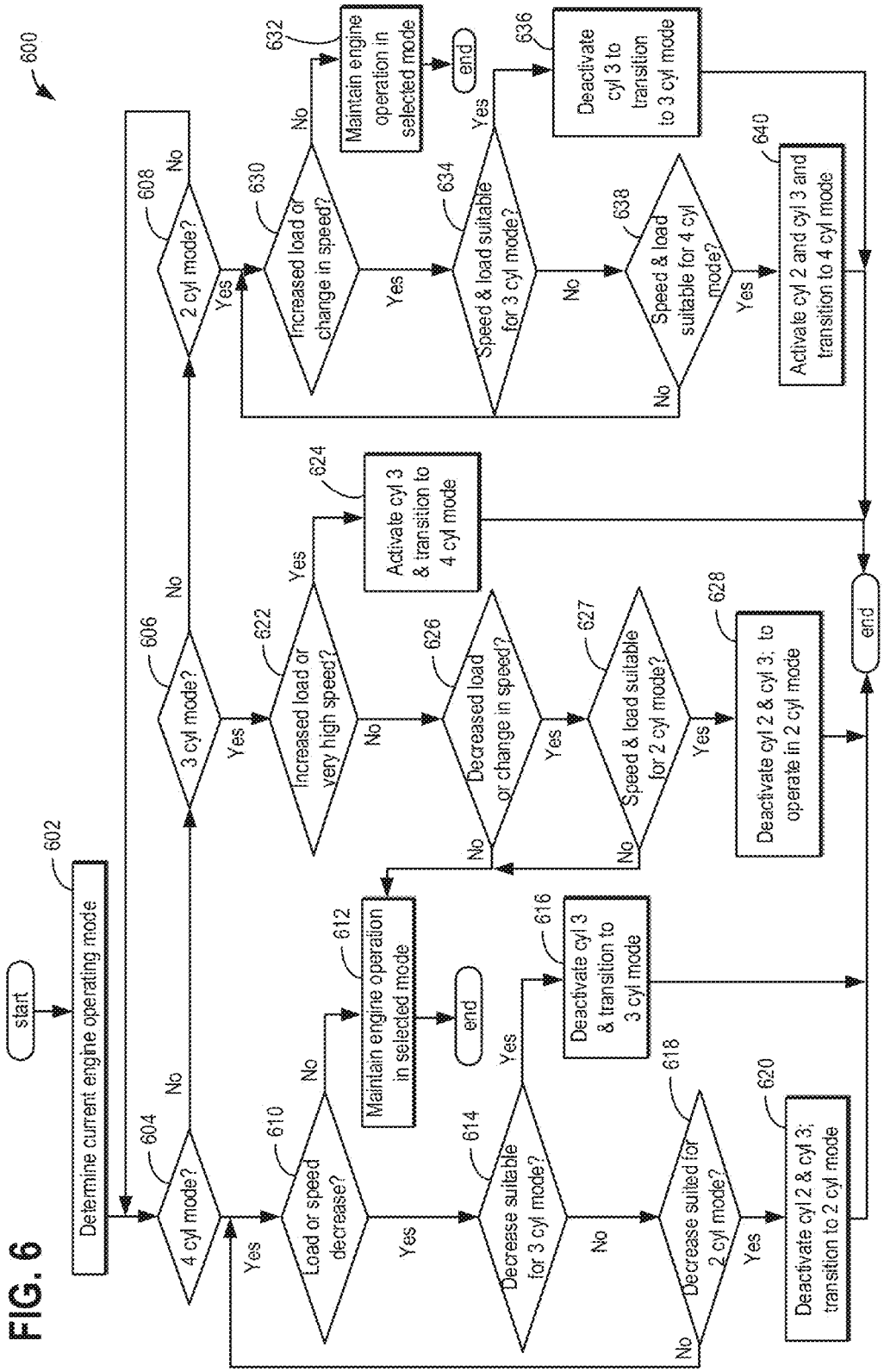
FIG. 6 shows a method for switching between VDE and non-VDE modes of the engine based on a detected engine load.
Figure 7:
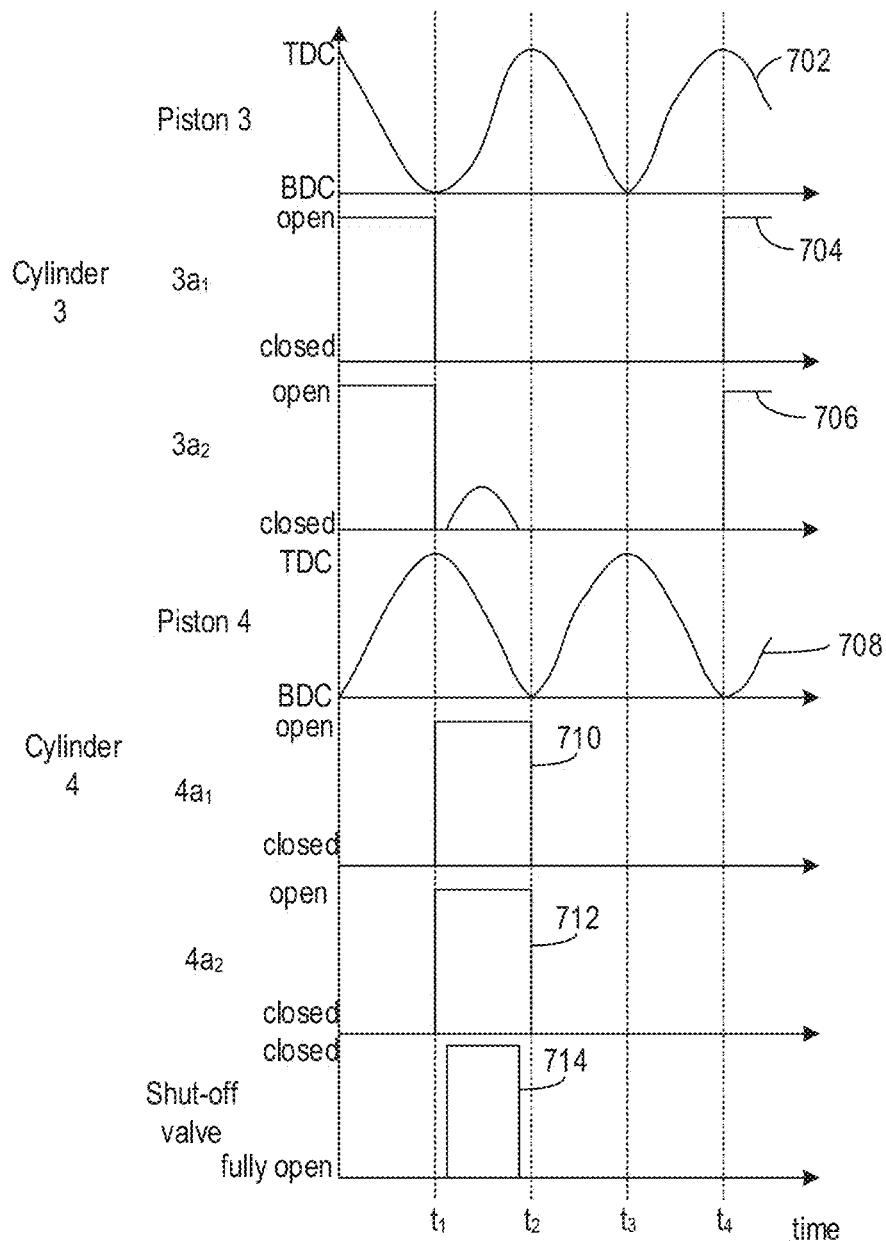
FIG. 7 shows an engine operating sequence depicting inlet valve positions in response to piston strokes for a cylinder group.

Turning now to FIG. 6, routine 600 for determining transitions in engine operating modes based on engine load and engine speed conditions is described. Specifically, the engine may be transitioned from a non-VDE mode to one of two VDE modes and vice versa, and may also be transitioned between the two VDE modes.

At 602, the current operating mode may be determined. For example, the four-cylinder engine may be operating in a non-VDE full cylinder mode, a three-cylinder VDE mode, or a two-cylinder VDE mode. At 604, it may be determined if the engine is operating in the four-cylinder mode. If not, routine 600 may move to 606 to determine if the current mode of engine operation is the three-cylinder VDE mode. If not, routine 600 may determine at 608 if the engine is operating in the two-cylinder VDE mode. If not, routine 600 returns to 604.

At 604, if it is confirmed that a non-VDE mode of engine operation is present, routine 600 may continue to 610 to confirm if engine load and/or engine speed have decreased. If the existing engine operating mode is a non-VDE mode with all four cylinders activated, the engine may be experiencing high or very high engine loads. In another example, a non-VDE mode of engine operation may be in response to very high engine speeds. Thus, if the engine is experiencing high engine loads to operate in a non-VDE mode, a change in operating mode may occur with a decrease in load. A decrease in engine speed may also enable a transition to a VDE mode. An increase in engine load or speed may not change operating mode.

If it is confirmed that a decrease in load and/or speed has not occurred, at 612, the existing engine operating mode may be maintained and routine 600 ends. However, if it is determined that a decrease in engine load and/or speed has occurred, routine 600 progresses to 614 to determine if the decrease in engine load and/or speed makes it suitable to operate in three-cylinder mode. A transition to moderate load-moderate speed conditions, and to moderate load-high speed conditions may enable engine operation in three-cylinder VDE mode. It will be appreciated that a transition to three-cylinder VDE mode may also occur during low speed-low load conditions. Accordingly, if it is confirmed that existing load and/or speed conditions enable a transition to three-cylinder mode, at 616, a transition to three-cylinder VDE mode may occur. Further, cylinder 2 or cylinder 3 of the four cylinders may be deactivated while maintaining the remaining three cylinders activated. Further still, transitioning to the three-cylinder VDE mode comprises closing a shut-off valve in a flow transfer duct fluidly coupling the deactivated cylinder to an adjacent activated cylinder. For example, if cylinder 3 is deactivated, then shut-off valve 8b in flow transfer duct 8 may be moved to a closed position such that charge air produced by cylinder 3 may be provided to cylinder 4, during an intake stroke of cylinder 4. Routine 600 may then end.

If at 614 it is determined that the decrease in engine load and/or engine speed is not suitable for operating in three-cylinder mode, routine 600 continues to 618 to confirm that the decrease in engine load and/or engine speed enables engine operation in two-cylinder mode. Low engine loads with moderate engine speeds may enable a two-cylinder VDE mode. If the engine load and/or engine speed are not suited for the two-cylinder mode, routine 600 returns to 610. Else, at 620 a transition to two-cylinder VDE mode from non-VDE mode may be completed by deactivating cylinders 2 and 3, while maintaining cylinders 1 and 4 in an activated condition. Additionally, shut-off valves in a flow transfer duct between cylinders 1 and 2 and a flow transfer duct between cylinder 3 and 4 are moved to a closed position such that charge air generated by deactivated cylinders 2 and 3 may be provided to operational cylinders 1 and 4, respectively. Routine 600 may then end.

Returning to 606, if it is confirmed that the current engine operating mode is the three-cylinder VDE mode, routine 600 continues to 622 to determine if engine load has increased or if the engine speed is very high. If the engine speed is very high, the engine may be operated in full-cylinder mode. If the existing operating mode is the three-cylinder mode, the engine may have previously experienced moderate load-moderate speed conditions, or moderate load-high speed conditions. Alternatively, the engine may be at low load-low speed conditions. Therefore, a transition from the existing mode may occur with an increase in engine load or a significant increase in engine speed. If an increase in engine load and/or very high engine speed is confirmed at 622, routine 600 progresses to 624 to transition to a non-VDE mode. Therefore, cylinder 1 may be activated to operate the engine in four-cylinder mode. As such, if cylinder 3 was deactivated in the three-cylinder VDE mode, then cylinder 3 is activated and the shut-off valve in the flow transfer duct between cylinders 3 and 4 is opened. In one example, cylinder 3 no longer provides charge air to cylinder 4 in the non-VDE mode.

If an increase in engine load and/or very high engine speed is not determined at 622, routine 600 may confirm at 626 if a decrease in engine load or a change in engine speed has occurred. As explained earlier, if the engine had previously been operating at moderate load-moderate speed conditions, a decrease in load may enable a transition to two-cylinder VDE mode. In another example, a transition to two-cylinder VDE mode may also be initiated if an existing low load-low speed condition changes to a low load-moderate speed condition. In yet another example, a transition from a low load-high speed condition to a low load-moderate speed condition may also enable engine operation in two-cylinder VDE mode. If a change in speed and/or decrease in load is not determined, then routine 600 progresses to 612 where the existing engine operating mode may be maintained. However, if a decrease in engine load or a change in engine speed is confirmed, routine 600 continues to 627 to determine if the changes in speed and/or the decrease in load are suitable for engine operation in two-cylinder mode. If yes, engine operation may be transitioned to two-cylinder VDE mode at 628. Herein, cylinders 2 may be deactivated, cylinder 3 may be maintained deactivated, and cylinders 1 and 4 are maintained in an active mode. The shut-off valve in the flow transfer duct between cylinders 1 and 2 is closed such that both the shut-off valves are closed and cylinders 2 and 3 may be operated as charge air supplying cylinders. If the decrease in engine load and/or change in engine speed do not enable operation in two-cylinder mode, routine 600 continues to 612 where the existing engine operating mode may be maintained.

Returning to 608, if it is confirmed that the current engine operating mode is the two-cylinder VDE mode, routine 600 continues to 630 to determine if engine load has increased or if engine speed has changed. If the existing operating mode is the two-cylinder mode, the engine may have previously experienced low to moderate engine loads at moderate engine speeds. Therefore, a transition from the existing mode may occur with an increase in engine load. A decrease in load may not change the engine operating mode. Further, a change from the existing mode may also occur if engine speed decreases to low speed or increases to high (or very high) speed. If an increase in engine load and/or a change in engine speed is not confirmed at 630, routine 600 progresses to 632 to maintain the existing two-cylinder VDE mode.

If an increase in engine load and/or a change in engine speed is confirmed at 630, routine 600 may continue to 634 to determine if the engine load and/or engine speed enable a transition to three-cylinder VDE mode. For example, engine load may be at moderate levels to enable transition to three-cylinder VDE mode. If yes, engine operation may be transitioned to three-cylinder VDE mode at 636. Further, cylinders 1 and 4 may remain active, cylinder 3 remains deactivated, and cylinder 2 is activated. Shut-off valve in the flow transfer duct between cylinders 1 and 2 is adjusted to an at least partially open position. As such, shut-off valve in the flow transfer duct between cylinders 3 and 4 remains closed. Alternatively, cylinder 3 is activated and cylinder 2 remains deactivated, where shut-off valve in the flow transfer duct between cylinders 3 and 4 is opened. If the engine load and/or engine speed are not suitable for engine operation in three-cylinder mode, routine 600 may continue to 638 to determine if the engine load and/or engine speed enable engine operation in four-cylinder mode (e.g., non-VDE mode). For example, engine load may be very high. In another example, engine speed may be very high. If yes, at 640, cylinders 2 and 3 may be activated and the engine may be transitioned to non-VDE mode of operation. This further includes opening shut-off valves of the flow transfer ducts to allow intake air from the intake manifold to enter the flow transfer ducts. Routine 600 may then end. If the increase in engine load and/or change in speed is not sufficient to operate the engine in full-cylinder mode, routine 600 may return to 630.

Thus, a controller may determine engine operating modes based on the existing combination of engine speed and engine load. A controller may be configured to perform routines, such as the routines of FIGS. 5 and 6, to determine an engine mode of operation and transitions between the two modes based on an engine load-engine speed map. By operating the engine in one of two available modes, transitions in engine operation may be reduced affording a decrease in torque disturbances and smoother engine control.

As such, a method comprising responsive to deactivating a cylinder, directly coupling intake ports of the cylinder and an adjacent cylinder via a shut-off valve and flowing compressed intake air directly between the cylinders via the coupled intake ports. In one example of the method, the cylinder and adjacent cylinder may have two intake ports. A first intake port of the deactivated cylinder may be used to admit charge air directly from a compressor into the cylinder while a second intake port may be coupled to a third intake port of the adjacent cylinder, while a fourth intake port of the adjacent cylinder may be used to admit charge air directly from a compressor into the adjacent cylinder. Charge air received by the adjacent cylinder, through the third intake valve, and from the second intake valve may be charge air generated by the deactivated cylinder. In this way, the first and fourth intake valves may admit charge air from the compressor during an intake stroke of the deactivated cylinder and adjacent cylinder, respectively. Additionally, the second inlet valve of the deactivated cylinder discharges charge air from the deactivated cylinder during its compression stroke to the third inlet valve during an intake stroke of the adjacent cylinder.

Turning now to FIG. 7, it shows an engine operating sequence 700 illustrating example results for an engine operating in a variable displacement engine (VDE) mode (e.g., internal combustion engine with cylinders 3 and 4 shown in the embodiment of FIG. 1). Specifically, the engine operating sequence 700 shows results from the engine operating with cylinder 3 being deactivated and cylinder 4 being operational and/or activated and/or firing. Thus, cylinder 3 may be used as an air charge supplying cylinder in the embodiment of FIG. 7. Line 702 represents a piston position of the piston corresponding to cylinder 3. Line 704 represents a position of a first intake valve of cylinder 3 (e.g., intake valve $3a_1$ as shown in FIG. 1). Line 706 represents a position of a second intake valve (e.g., intake valve $3a_2$ as shown in FIG. 1). Line 708 represents a piston position of the piston corresponding to cylinder 4. Line 710 represents a position of a first intake valve of cylinder 4 (e.g., intake valve $4a_1$ as shown in FIG. 1). Line 712 represents a position of a second intake valve of cylinder 4 (e.g., intake valve $4a_2$ as shown in FIG. 1). Line 714 represents a position of a shut-off valve in a flow transfer duct fluidly coupling cylinders 3 and 4 (e.g., shut-off valve 8b in the flow transfer duct 8 shown in FIG. 1). As shown in the embodiment of FIG. 1, the flow transfer duct fluidly connects intake valve $3a_2$ of cylinder 3 to intake valve $4a_1$ of cylinder 4. In this way, gas flowing out of an at least partially open intake valve $3a_2$ may flow into the flow transfer duct before flowing through an at least partially open intake valve $4a_1$. The horizontal axes of each plot represent time and time increases from the left side of the figure to the right side of the figure.

Prior to $t_1$, piston 3 moves from a top dead center (TDC) position toward a bottom dead center (BDC) position (shown by line 702), indicating an intake stroke for cylinder 3. Piston 4 moves from a BDC position toward a TDC position (shown by line 708), indicating an exhaust stroke for cylinder 4. A crank angle (CA) difference between TDC and BDC is 180 CA degrees. As such, intake valves $3a_1$ and $3a_2$ are in open positions (shown by lines 704 and 706, respectively) to admit air into cylinder 3 while intake valves $4a_1$ and $4a_2$ are in closed positions (shown by lines 710 and 712, respectively). In one example, the intake valves $3a_1$ and $3a_2$ are in fully open positions. In other examples, the intake valves are in at least partially open positions (e.g., between closed and fully open). Thus, cylinder 4 exhausts combustion gas while cylinder 3 receives intake air from an intake manifold. The shut-off valve in the flow transfer duct is open. As such, intake air from the intake manifold may flow through the open intake valve $3a_2$ and into cylinder 3.

At $t_1$, piston 3 reaches BDC and piston 4 reaches TDC. As such, the intake stroke of cylinder 3 is complete and the intake valves $3a_1$ and $3a_2$ move to the closed position. Thus, intake air from the intake manifold may no longer flow into cylinder 3. Furthermore, the exhaust stroke of cylinder 4 is complete. Intake valves $4a_1$ and $4a_2$ of cylinder 4 move toward open positions as cylinder 4, and thus piston 4, transition from the exhaust stroke to an intake stroke. The shut-off valve remains in the open position and intake air from the intake manifold continues to flow into the After $t_1$ and prior to $t_2$, the piston 3 moves toward the TDC during the compression stroke for cylinder 3 and piston 4 moves toward BDC during the intake stroke for cylinder 4. Intake valves $4a_1$ and $4a_2$ are open to allow cylinder 4 to receive intake air from the intake manifold. As piston 3 moves toward TDC, intake valve $3a_1$ remains in the closed position while intake valve $3a_2$ moves to an open position. The open position of intake valve $3a_2$ during the compression stroke of piston 3 may be variable to adjust an amount of compressed air exiting cylinder 3 via intake valve $3a_2$. Said another way, piston 3 compresses intake air received by cylinder 3 prior to $t_1$, where intake valve $3a_2$ opens to emit charge air from cylinder 3 into the flow transfer duct following a threshold rotation of the piston 3. The threshold rotation may be based on a degree of rotation of the piston outside of BDC. For example, the threshold rotation is equal to 35 to 110 CA. As such, the intake valve $3a_2$ opens when the piston 3 is between BDC and TDC. Furthermore, the shut-off valve is closed such that charge air flowing out of cylinder 3 into the flow transfer duct does not mix with intake air from the intake manifold. Thus, the flow transfer duct is fluidly sealed from the intake manifold when the shut-off valve is closed. In this way, charge air flows out of cylinder 3 via intake valve $3a_2$, through the flow transfer duct, and into cylinder 4 via intake valve $4a_1$. Intake valve $4a_2$ receives intake gas from the intake manifold such that intake gas from the intake manifold and charge air from cylinder 3 mix in cylinder 4. In this way, the engine may operate in a VDE mode through a greater load range considering cylinder 3 may operate as a charge air supplying cylinder when it is deactivated.

As piston 4 is a threshold crank angle away from BDC (e.g., within 15 CA or less, in one example), then the intake valve $3a_2$ may be moved to a closed position and the shut-off valve may be moved to an open position. As such, cylinder 3 is hermetically sealed from the intake manifold and flow transfer duct, while intake air from the intake manifold may flow through the flow transfer duct and into cylinder 4. Thus, during the intake stroke of cylinder 4, the cylinder 4 initially receives charge air from the intake manifold. Once intake air in cylinder 3 has been sufficiently compressed (e.g., when piston 3 is between BDC and TDC), shut-off valve in the flow transfer duct is closed to seal the flow transfer duct is hermetically sealed from the intake manifold so that cylinder 3 may expel charge air into the flow transfer duct. The charge air flows to cylinder 4 and enters cylinders 4 via an inlet valve. Furthermore, cylinder 4 may be configured to receive charge air from cylinder 3 via a first intake valve, while simultaneously receiving charge air from an intake manifold via a second intake valve.

In some examples, additionally or alternatively, the shut-off valve may be closed once cylinder 3 is deactivated and remain closed during the entire deactivation of cylinder 3 (e.g., prior to $t_1$). As such, cylinder 3 may receive charge air from the intake manifold via one intake valve (e.g., intake valve $3a_1$) while the second intake valve (e.g., intake valve $3a_2$) is hermetically sealed from the intake manifold. Following a sufficient compression of intake gas in cylinder 3 (e.g., which may occur 35-110 CA outside BDC toward TDC), the second intake valve $3a_2$ is opened such that the compressed air may flow into the flow transfer duct. Thus, the flow transfer duct provides charge air from cylinder 3 to cylinder 4 during the intake stroke of piston 4 of cylinder 4, while an intake line (e.g., second intake line $6a_2$) allows charge air from the intake manifold to flow into cylinder 4.

At $t_2$, piston 3 reaches TDC and piston 4 reaches BDC. Intake valves $4a_1$ and $4a_2$ are closed. Intake valves $3a_1$ and $3a_2$ remain closed. The shut off valve is in an open position. As such, intake air does not flow into cylinders 3 or 4.

After $t_2$ and prior to $t_3$, piston 3 moves out of TDC toward BDC while piston 4 moves out of BDC toward TDC. As such, piston 3 is undergoing a combustion stroke and piston 4 is undergoing a compression stroke. Intake valves $3a_1$, $3a_2$, $4a_1$, and $4a_2$ remain closed. The shut-off valve remains in the closed position.

At $t_3$, piston 3 reaches BDC and piston 4 reaches TDC, signaling the end of the combustion and compression strokes, respectively. Intake valves $3a_1$, $3a_2$, $4a_1$, and $4a_2$ remain closed. The shut-off valve remains in the closed position.

After $t_3$ and prior to $t_4$, piston 3 moves out of BDC toward TDC while piston 4 moves out of TDC toward BDC. As such, piston 3 is undergoing an exhaust stroke and piston 4 is undergoing a combustion stroke. Intake valves $3a_1$, $3a_2$, $4a_1$, and $4a_2$ remain closed. The shut-off valve remains in the closed position.

At $t_4$, piston 3 reaches TDC and piston 4 reaches BDC, signaling the end of the exhaust and combustion strokes, respectively. Intake valves $4a_1$ and $4a_2$ remain closed. Intake valves $3a_1$ and $3a_2$ are moved to an open position as piston 3 begins its intake stroke. The shut-off valve remains in the closed position.

After $t_4$, piston 3 moves out of TDC toward BDC while piston 4 moves out of BDC toward TDC. As such, piston 3 is undergoing an intake stroke and piston 4 is undergoing an exhaust stroke. Intake valves $3a_1$ and $3a_2$ remain open to admit intake air from the intake manifold into cylinder 3. Intake valves $4a_1$ and $4a_2$ remain closed. The shut-off valve remains in the closed position.

In this way, a variable displacement engine comprising at least two cylinders including a first cylinder and a second cylinder may deactivate the first cylinder during lower engine loads while the second cylinder may not be deactivated. When the first cylinder is deactivated, it may be used to compress intake air via a piston of the first cylinder, wherein the compressed intake air is provided to the second cylinder. The compressed intake air may flow through a flow transfer duct fluidly coupling at least one intake valve of the first cylinder to at least one intake valve of the second cylinder. A shut-off valve may be located in the flow transfer duct to seal the flow transfer duct from an intake manifold such that intake air from the intake manifold may not flow into the flow transfer duct when the shut-off valve is in a closed position. The technical effect of closing the shut-off valve is to allow charge air from the first cylinder to flow to the second cylinder to increase a power output of the second cylinder during reduced engine loads where one or more cylinders are deactivated. Furthermore, by doing this, an exhaust gas temperature may be maintained and pumping losses may decrease compared to simply flowing the charge air from the first cylinder to an exhaust passage without flowing the charge air to the second cylinder. Thus, a range in which a VDE mode is used may be increased, thereby increasing fuel economy.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
operating a supercharged auto-ignition internal combustion engine having at least one cylinder head comprising at least two cylinders,
each cylinder having at least one outlet opening for discharging exhaust gases to an exhaust-gas discharge system and at least one inlet opening for receiving charge air from an intake system, and where each cylinder further comprises a piston which is movable along a piston longitudinal axis between a bottom dead center BDC and a top dead center TDC; and the intake system further comprising at least one exhaust-gas turbocharger a compressor coupled to a turbine arranged in the exhaust-gas discharge system;
adjusting a position of the inlet openings and outlet openings of the cylinders via a valve drive, and
deactivating one of the two cylinders during some engine conditions, where the deactivation further includes discharging intake air received by the deactivated cylinder to an operational cylinder through at least one inlet opening of the inlet openings of the deactivated cylinder following a compression stroke of a piston of the deactivated cylinder moving from bottom dead center to top dead center to a flow transfer duct, and where the flow transfer duct direct the discharged charge air to an operational cylinder.

2. The method as claimed in claim 1, wherein the at least one inlet opening of the deactivated cylinder is opened between a range later than 50° CA to 90° CA after bottom dead center during the course of the compression stroke.

3. The method of claim 2, wherein the at least one inlet opening of the deactivated cylinder is closed before the piston reaches top dead center during the compression stroke.

4. The method of claim 1, wherein the at least one inlet opening and at least one outlet opening oscillate between open and closed positions, and where a valve lift $\Delta h$ may be measured between an open position and a closed position during an oscillating duration $\Delta t$.

5. The method of claim 4, wherein a valve lift $\Delta h$ comprises an intake stroke valve lift $\Delta h_{in}$ measured during the course of the intake stroke, and where the intake stroke valve lift $\Delta h_{in}$ is at least three times greater than a compression stroke valve lift $\Delta h_{comp}$ measured during the course of the compression stroke of the deactivated cylinder.

6. The method of claim 1, wherein each cylinder of the two cylinders has two inlet openings for admitting intake air, and where a first inlet opening of the deactivatable cylinder is opened during a compression stroke of the deactivatable cylinder to flow charge air to the operational cylinder during the deactivation of the deactivatable cylinder.

7. The method of claim 6, wherein during the deactivation of the deactivatable cylinder, both of the inlet openings are open during an intake stroke of the deactivated cylinder, and where only one of the two inlet openings is open during the compression stroke of the deactivatable cylinder, and where the open inlet opening allow charge air to flow out of the deactivated cylinder, through the flow transfer duct, through an open inlet opening of the operational cylinder, and into the operational cylinder during an intake stroke of the operational cylinder.

8. The method of claim 6, wherein during the deactivation of the deactivatable cylinder, both of the inlet openings are open during an intake stroke of the deactivated cylinder, and where the two inlet openings are open during the compression stroke of the deactivatable cylinder, and where the inlet openings allow charge air to flow out of the deactivated cylinder, through the flow transfer duct, through an open inlet opening of the operational cylinder, and into the operational cylinder during an intake stroke of the operational cylinder.

9. The method of claim 1, wherein the flow transfer duct is formed by the intake system, and where the flow transfer duct fluidly couples at least one inlet opening of the deactivatable cylinder to at least one inlet opening of the operational cylinder, and where a shut-off valve is configured to seal the flow transfer duct from the intake system.

10. A method comprising:
deactivating a second cylinder of a pair of adjacent first and second cylinders, where each of the pair of cylinders comprises two inlet valves and two outlet valves;
flowing intake air from an intake manifold to the second cylinder during an intake stroke of the second cylinder via the two inlet valves;
compressing intake air in the second cylinder during a compression stroke of the second cylinder, and where at least one inlet valve of the two inlet valves of the second cylinder is at least partially opened during the compression stroke; and
discharging charge air from the second cylinder to the first cylinder via a flow transfer duct fluidly coupling the at least one inlet valve of the second cylinder to a nearest inlet valve of the first cylinder.

11. The method of claim 10, wherein the flow transfer duct comprises a shut-off valve configured to fluidly separate the flow transfer duct from the intake manifold when in a closed position, and where the shut-off valve is moved to the closed position when the second cylinder is deactivated.

12. The method of claim 10, wherein the flow transfer duct comprises a shut-off valve configured to fluidly separate the flow transfer duct from the intake manifold when in a closed position, and where the shut-off valve is moved to the closed position when the at least one inlet valve of the two inlet valves of the second cylinder is at least partially opened during the compression stroke of the second cylinder.

13. The method of claim 10, wherein the first cylinder receives charge air from the second cylinder through a first inlet valve and where the first cylinder receives charge air from the intake manifold through a second inlet valve, and where the first inlet valve is fluidly coupled to the flow transfer duct.

14. A system comprising:
an in-line four cylinder diesel engine where each cylinder comprises at least two inlet valves and at least two outlet valves, the engine further comprising an intake manifold with a number of inlet runners equal to a total number of inlet valves of the cylinders;
a first group of cylinders comprising a first outer cylinder and a second inner cylinder adjacent to the first cylinder; and a first flow transfer duct fluidly coupling at least one inlet valve of the first outer cylinder to at least one inlet valve of the second inner cylinder;
a second group of cylinders comprising a third inner cylinder and a fourth outer cylinder adjacent the third inner cylinder, and a second flow transfer duct fluidly coupling at least one inlet valve of the third inner cylinder to at least one inlet valve of the fourth outer cylinder; and a valve drive configured to adjust a position of the inlet and outlet valves of the cylinders, the valve drive further configured to deactivate at least one cylinder of each of the first and second cylinder groups, where air is conducted into the deactivated cylinder via its inlet valves and then out of the deactivated cylinder to the adiacent cylinder via one of the flow transfer ducts.

15. The system of claim 14, wherein the first flow transfer duct fluidly couples proximal inlet valves of the first outer cylinder and the second inner cylinder, and where the second flow transfer duct fluidly couples proximal inlet valves of the third inner cylinder and the fourth outer cylinder, the first flow transfer duct being fluidly separated from the second flow transfer duct.

16. The system of claim 14, wherein the first and second flow transfer ducts comprise first and second shut-off valves configured to fluidly separate the first and second flow transfer ducts from the intake manifold and inlet runners, respectively.

17. The system of claim 14, wherein the second inner cylinder and the third inner cylinder are deactivatable cylinders, and where the second and third inner cylinders are charge-air supplying cylinders to the first outer cylinder and the fourth outer cylinder, respectively, when the second and third inner cylinders are deactivated.

18. The system of claim 17, wherein the second and third inner cylinders generate charge air during respective compression strokes, and where at least one inlet valve of each of the second and third inner cylinders is at least partially opened during the compression strokes of the cylinders to discharge charge air from the cylinder to first and second flow transfer ducts respectively.

19. The system of claim 18, wherein inlet valves of the second and third inner cylinders opens to a first height during an intake stroke of the second and third inner cylinders, and where the inlet valves of the second and third inner cylinders opens to a second height during a compression stroke of the second and third inner cylinders when the second and third inner cylinders are deactivated, where the first height is greater than the second height.

20. The system of claim 14, further comprising a controller with computer-readable instructions for:

deactivating at least the second inner cylinder of the first cylinder group in response to an engine load being less than or equal to a moderate load, and opening an inlet valve of the second inner cylinder fluidly coupled to the first flow transfer duct during a compression stroke of the second inner cylinder in conjunction with an intake stroke of the first outer cylinder, and where charge air flows from the second inner cylinder, into the first flow transfer duct, through an inlet valve of the first outer cylinder, and into the first outer cylinder.

21. A method comprising:

responsive to deactivating a cylinder that receives intake air via an inlet valve, directly coupling intake ports of the deactivated cylinder and an adjancet cylinder via a shut-off valve and a flow transfer duct fluidly coupling the inlet valve to an inlet valve of the adiacent cylinder and flowing compressed intake air directly between the cylinders via, the inlet valves, the flow transfer duct, and the coupled intake ports.

* * * * *